United States Patent [19]
Kojima et al.

[11] Patent Number: 5,329,952
[45] Date of Patent: Jul. 19, 1994

[54] APPARATUS FOR WASHING DISHES

[75] Inventors: Toshio Kojima, Tokai; Chiyoshi Toya, Nagoya; Takeshi Hugikawa, Toyoake; Hiroshi Torimitsu, Nagoya; Tomio Suyama, Ohara; Sadayuki Hirate, Toyoake, all of Japan

[73] Assignee: Hoshizaki Denki Kabushiki Kaisha, Aichi, Japan

[21] Appl. No.: 826,390

[22] Filed: Jan. 27, 1992

[51] Int. Cl.⁵ .............................................. B08B 3/00
[52] U.S. Cl. ................................... 134/133; 134/134; 414/331
[58] Field of Search ............... 414/280, 331, 609, 661; 134/133, 134

[56] References Cited
U.S. PATENT DOCUMENTS

| | | | |
|---|---|---|---|
| 1,495,473 | 5/1924 | Fitzgerald | 134/111 X |
| 1,697,894 | 1/1929 | Wright | 134/82 X |
| 2,947,311 | 8/1960 | Fox et al. | 134/133 X |
| 4,032,027 | 6/1977 | Lindberg | 414/280 X |
| 4,634,333 | 1/1987 | Butterly, Jr. et al. | 414/331 |
| 4,744,379 | 5/1988 | Goettel | 134/133 X |

OTHER PUBLICATIONS

Kardex Industriever 8000 Brochure; Cat. #MH248, 1986; Kardex Systems Inc., Marietta, Ohio.

Primary Examiner—Michael S. Huppert
Assistant Examiner—Stephen Gordon
Attorney, Agent, or Firm—Koda and Androlia

[57] ABSTRACT

Disclosed is a process for washing dishes, which comprises carrying a rack with dishes to be washed into a downstream dishwasher by a rack carry-in unit; forwarding the rack after completion of washing in the dishwasher to a lifter unit disposed adjacent to the dishwasher with or without the aid of a rack carry-out mechanism; pulling the rack to a predetermined position in the lift by a rack loading device both disposed in the lifter unit; ascending or descending the lift to be positioned adjacent to a necessary pair of brackets of a wagon set to the outlet side of the lifter unit to carry out the rack loaded on the lift onto the pair of brackets; and ascending the lift after completion of carrying out the rack from the rack carry-out position and allowing the tapers, formed in the lift, facing the wagon so as to push the rack fully to a predetermined position in the wagon; and a system for practicing the process; wherein the arrangement of the respective units may be L-shaped or I-shaped, and the rack carry-out mechanism can be omitted in the I-shaped arrangement.

2 Claims, 20 Drawing Sheets

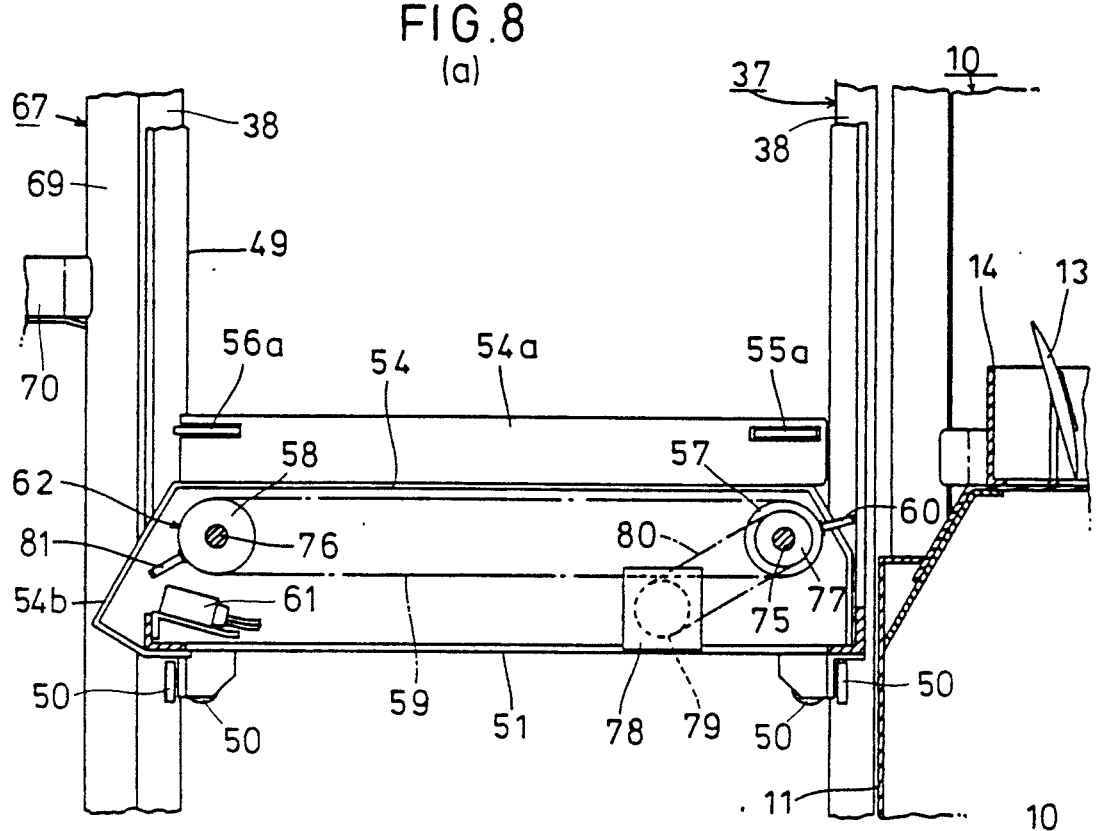
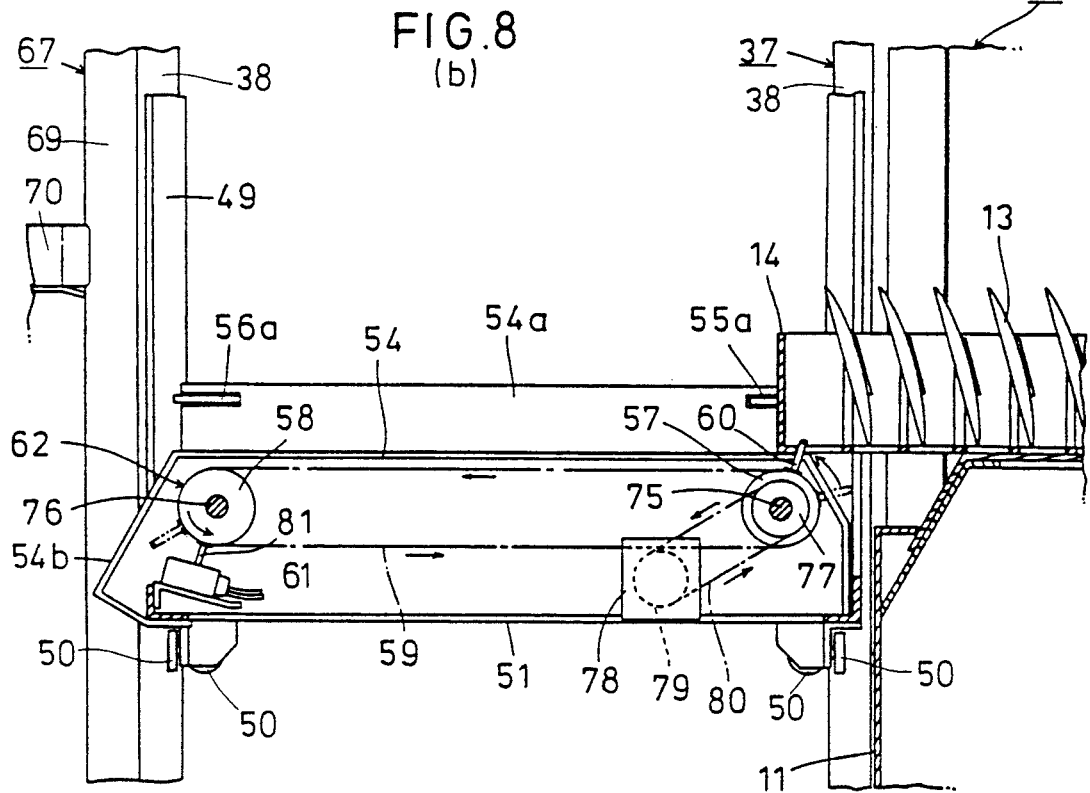
FIG.8

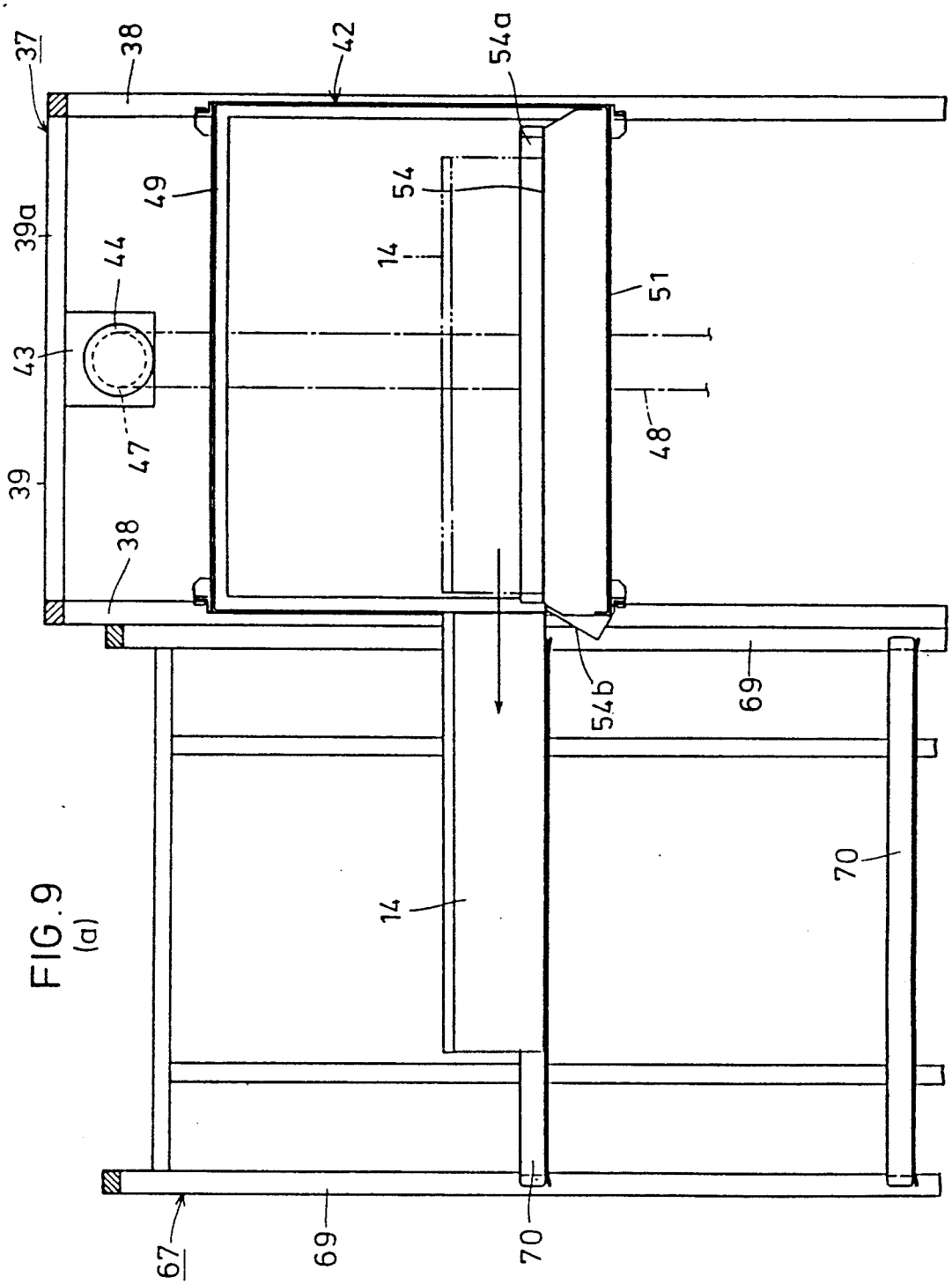

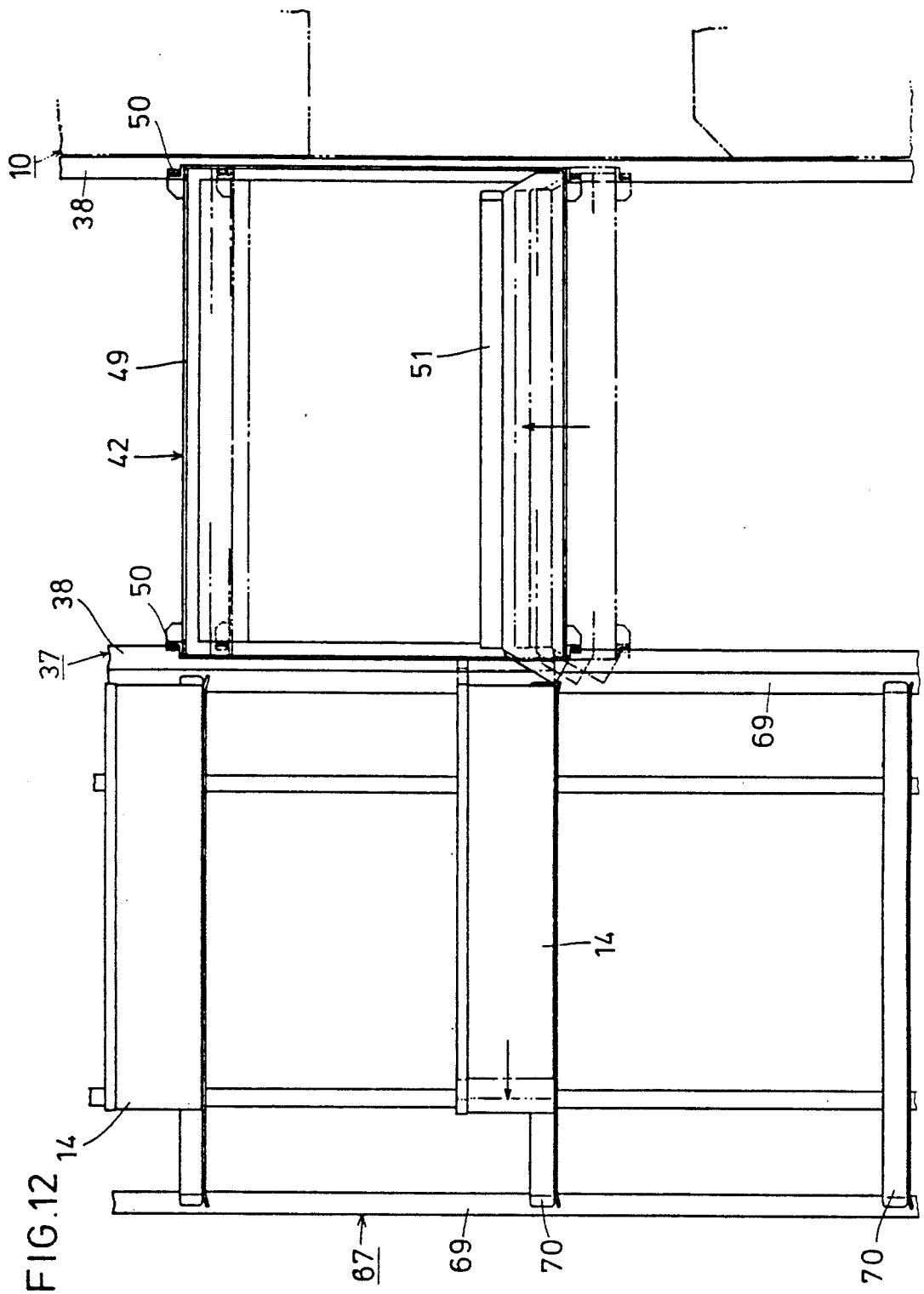

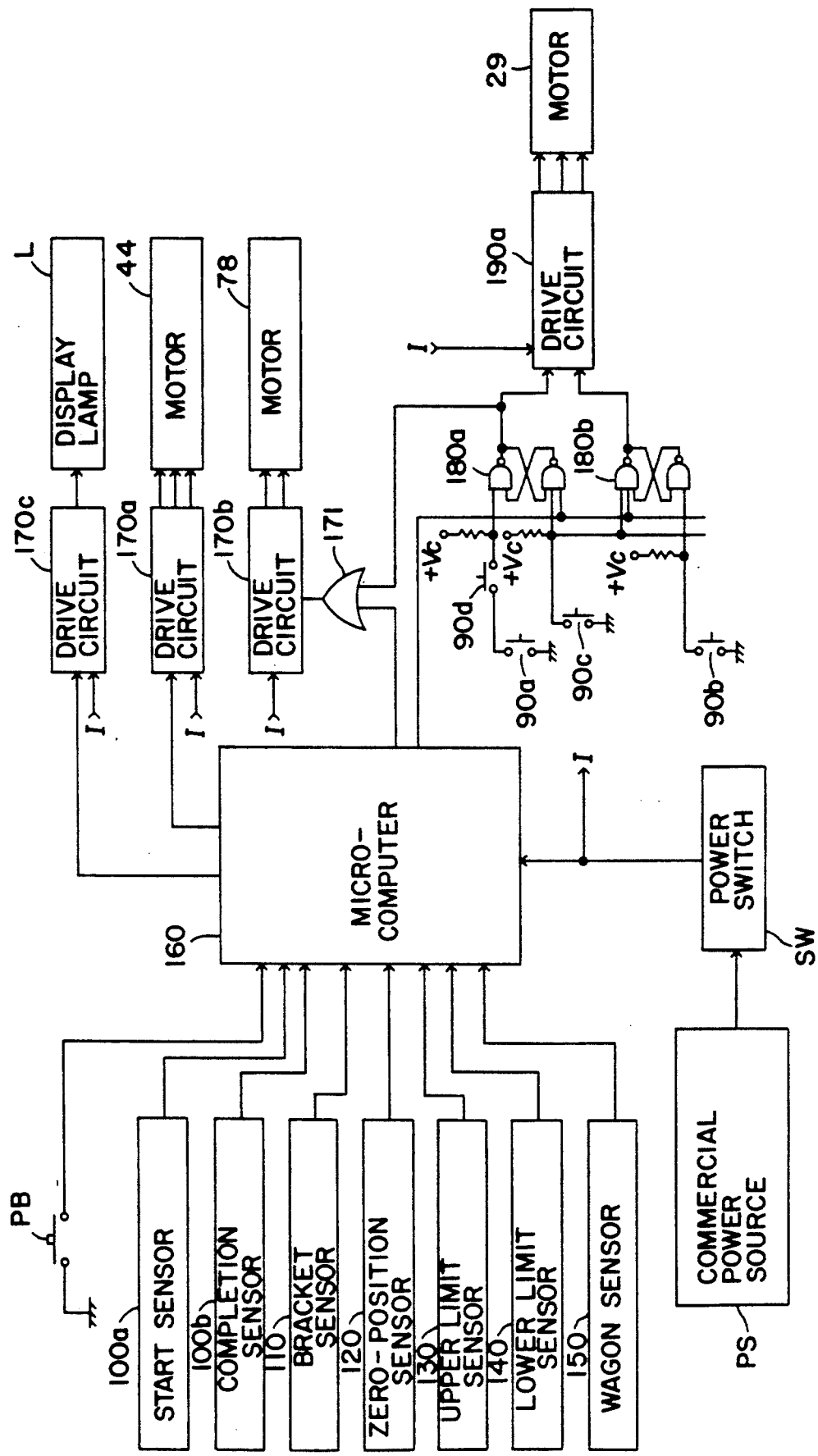

APPARATUS FOR WASHING DISHES

BACKGROUND OF THE INVENTION

This invention relates to a process for washing dishes in which a series of operations from washing of used dishes as carried in racks to loading of the racks with dishes to a wagon are carried out successively and automatically and to a system therefor.

Dishwashers which automatically wash large amounts of tableware such as dishes, teacups and glassware smeared after eating or drinking are installed mainly in the kitchens of coffee shops and restaurants and conveniently utilized for the business. To describe the basic structure of the dishwasher, for example, the dishwasher has a washing tank having an upper nozzle and a lower nozzle which rotate horizontally by the reactive force of jetting a cleaning fluid therefrom; a box-like casing which can cover the washing tank to define a washing chamber; and a pump for pressure-feeding the cleaning fluid to the nozzles, and a rack with dishes to be washed is designed to be accommodated in the washing chamber. The structure for introducing the rack into the washing chamber and removing it from the chamber after completion of washing is of:

(1) Door system, where a door is provided at the front side of the casing; or (2) Lift system, where the washing chamber is covered with a casing having an open bottom, and the rack can be introduced into or removed from the chamber by descending or ascending the casing.

In both systems, the rack with dishes to be washed from which leavings have preliminarily been removed is introduced into the washing chamber, and then a high-temperature cleaning fluid is jetted from the upper and lower rotating nozzles against the dishes in the rack to effect main washing for a predetermined time, followed by rinsing by jetting hot water from the same nozzles against the dishes for a predetermined time to complete the entire process for washing dishes.

By the way, conventional dishwashers all require manual operations for introducing the rack with dishes to be washed into the dishwasher and removing the rack therefrom after completion of washing. Such manual operations may not cause many problems in coffee shops and restaurants of ordinary scale, but in the kitchens of hotels having large banquet rooms and of large-scale drive-in restaurants, such manual operations can be an unnegligible matter.

In other words, when a huge amount of dishes to be washed are brought about at one time in such large-scale restaurants, the operation of carrying racks in and out of the dishwasher is too heavy for one operator in view of the amount of work and the working time, and besides operation efficiency of the dishwasher is lowered, disadvantageously. In such case, two operators generally share the operation of carrying in the rack and the operation of carrying out the rack, but it requires additional personnel cost.

Under such circumstances, a continuous dish washing system for large-scale restaurants has been proposed, for example, as disclosed in Japanese Provisional Utility Model Publication No. 7970/1987, in which dishes to be washed are loaded on an endless belt conveyor, and the dishes are washed, as the belt is fed, by the shower jetted from the shower pipes disposed along the belt at an upper position and a lower position.

It is true that a large amount of dishes can be washed in such belt type dish washing system, but the dishes cannot be washed and rinsed well in this system since the washing is carried out only while the dishes pass under the shower zone. Further, the dish conveying belt must inevitably be elongated so as to carry out sufficient washing and rinsing of the dishes, requiring a long space in the kitchen.

Further, in the belt type dish washing system, an operator carries the washed dishes manually to a rack. However, the dishes may be soiled, since they cannot be carried without being touched by the operator.

On the other hand, dishwashers used in large-scale restaurants generally suffer the following disadvantages: In the kitchen of a large scale restaurant, racks with washed dishes are removed from the dishwasher one after another as the washing operation proceeds. These racks in many cases are loaded on the brackets of a wagon having castors and stored at a predetermined place. Accordingly, a heavy work is forced on an operator to load heavy racks full of dishes manually onto a wagon under the present circumstances. Besides, while rinsing of dishes is carried out by jetting hot water against the dishes at the final stage of washing to heat the dishes and racks to a high temperature, the operator may suffer burning when he carries out the racks immediately after rinsing.

SUMMARY OF THE INVENTION

This invention is proposed in view of the above problems inherent in the washing of a great number of dishes in the large-scale restaurants and for the purpose of solving them successfully, and it is an object of this invention to provide a process for washing a large amount of used dishes effectively, which allows a series of operations from washing of used dishes as carried in a rack to loading of the rack to a wagon to be carried out successively and to a system for practicing the process successfully.

BRIEF DESCRIPTION OF THE DRAWINGS

FIG. 9(a) shows in side view the vertical cross section of the major section of the dish washing system when a rack is being transferred from the lift table to a wagon;

FIG. 12 shows in side view the dish washing system when the rack is pushed into the wagon by ascending the lift table; and FIG. 13 is a block diagram of one embodiment of control circuit in the dish washing system according to this invention.

DESCRIPTION OF THE PREFERRED EMBODIMENTS

Figure 1:
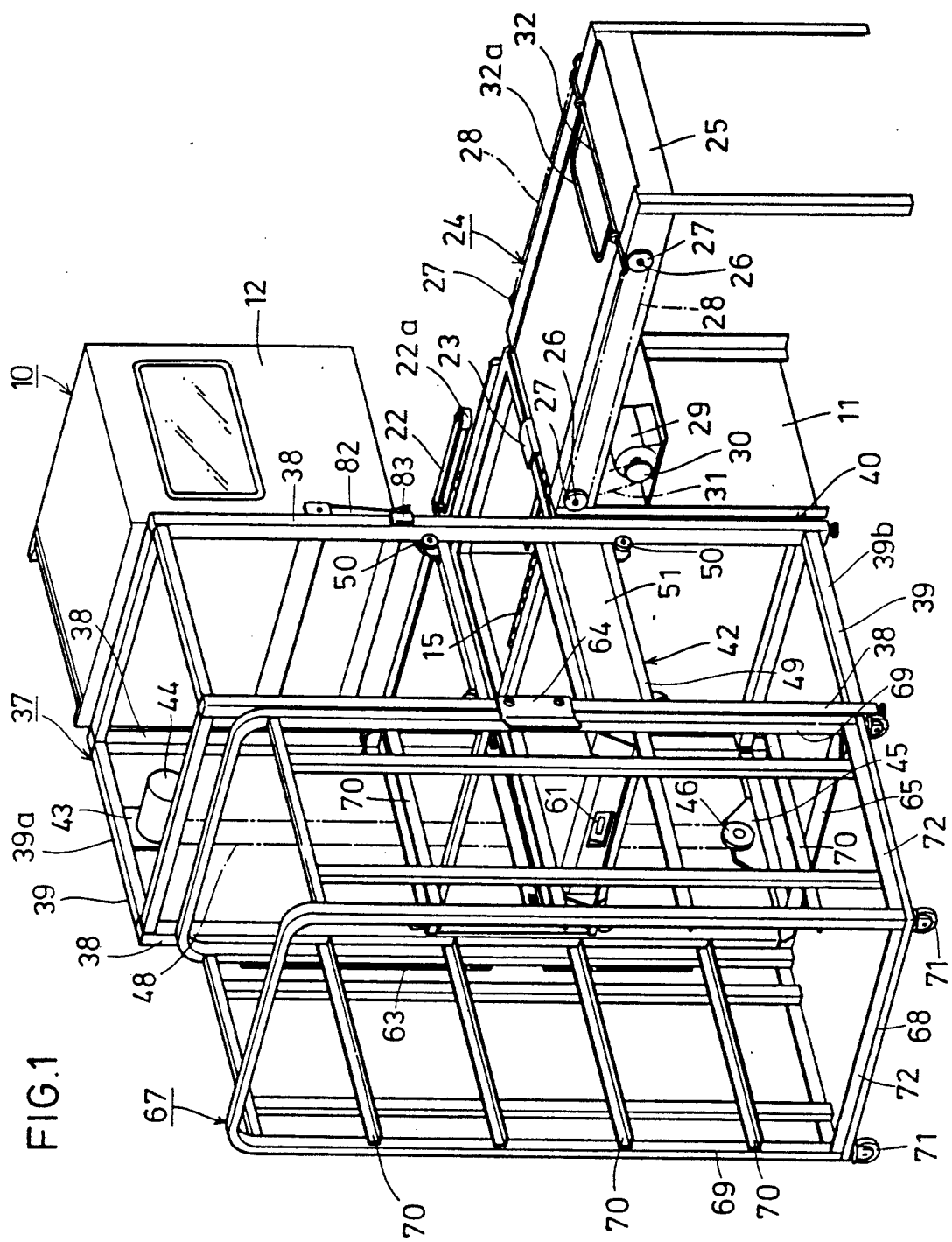
FIG. 1 shows schematically a perspective view of a dish washing system according to a preferred embodiment of this invention.
Figure 10:
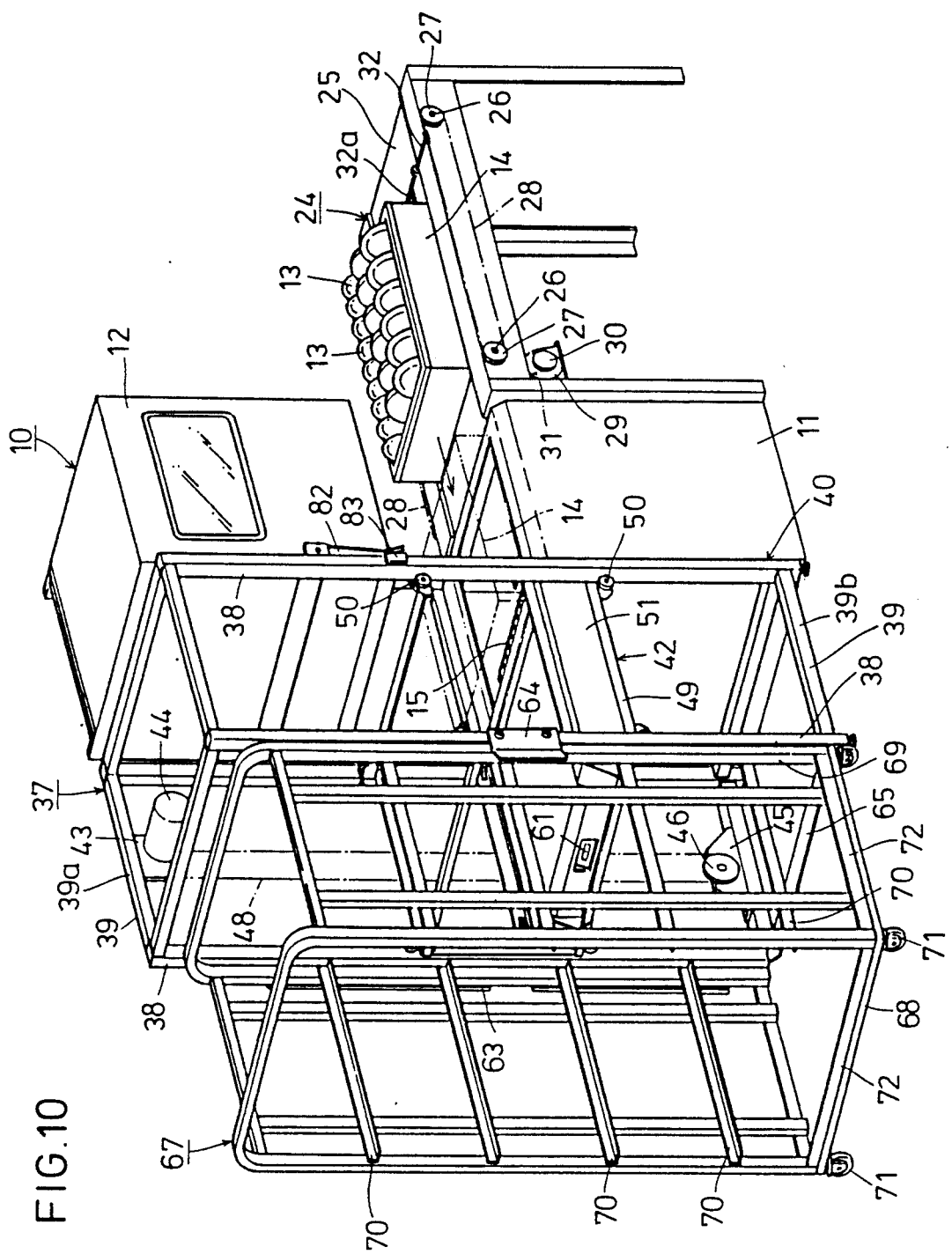
FIG. 10 shows schematically in side view a second preferred embodiment of the dish washing system according to this invention.

Next, the process for washing dishes according to this invention will be described in relationship with the system for practicing the process by way of preferred embodiments referring to the attached drawings. FIG. 1 shows schematically the entire constitution of the dish washing system for practicing the process according to a first aspect of this invention, in which the respective units constituting the system are arranged around the dishwasher to form an L-shape as a whole. FIG. 10 shows schematically the entire constitution of the dish washing system according to a second aspect of this invention, in which the respective units are arranged linearly (hereinafter referred to as "I-shaped").

The dish washing systems shown in FIGS. 1 and 10 respectively consist of the same units (i.e. rack carry-in unit, dishwasher, lifter and wagon), except for the difference in the arrangement of the units (L-shape or I-shape). In the dish washing system of the L-shaped arrangement, however, the transportation route of the rack is shifted by about 90° on the dishwasher, so that a rack carry-out device (to be described later) is additionally required.

Dishwasher

Figure 2:
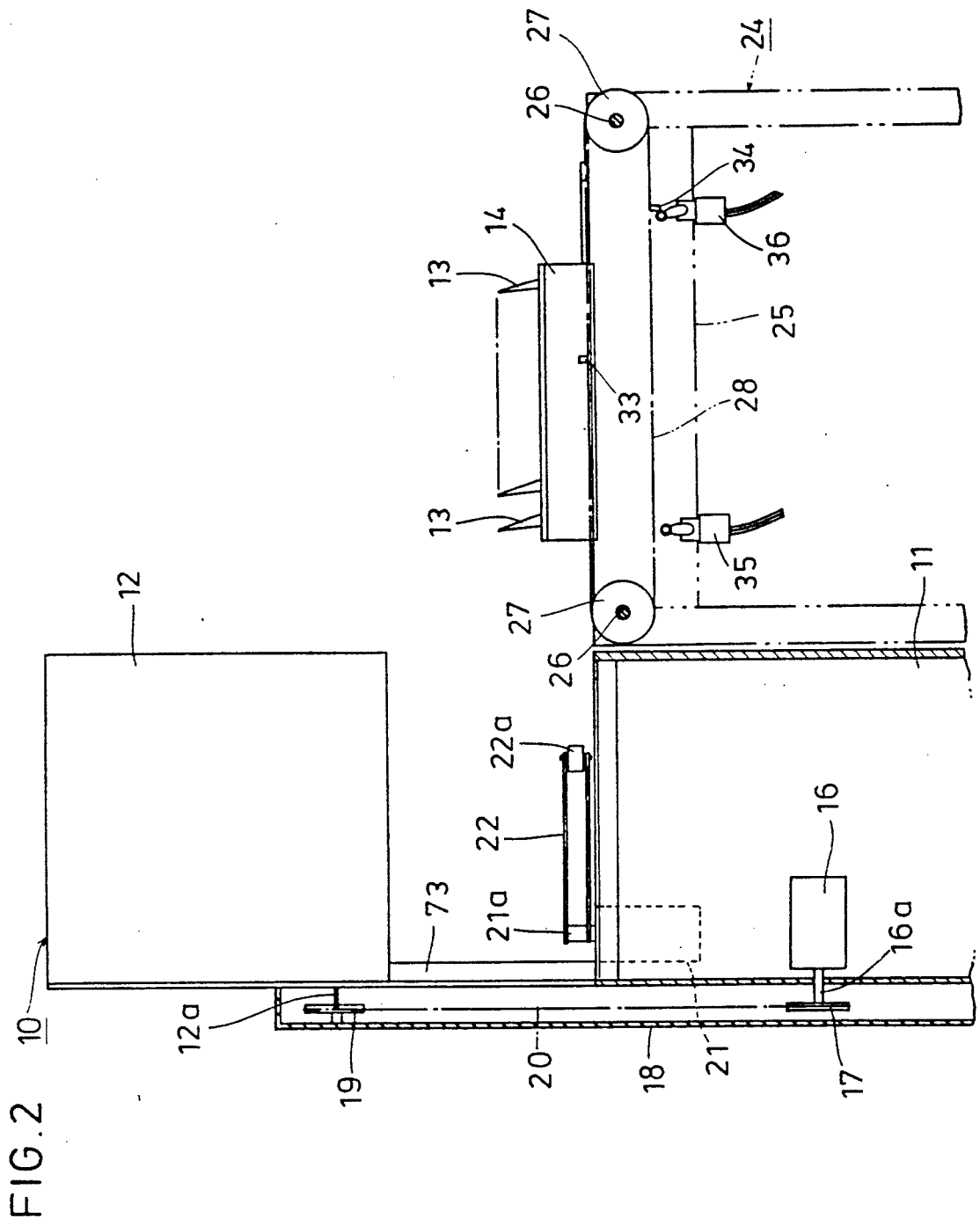
FIG. 2 shows partially in vertical cross section of a rack carry-in unit and the dish washing system shown in FIG. 1.
Figure 3:
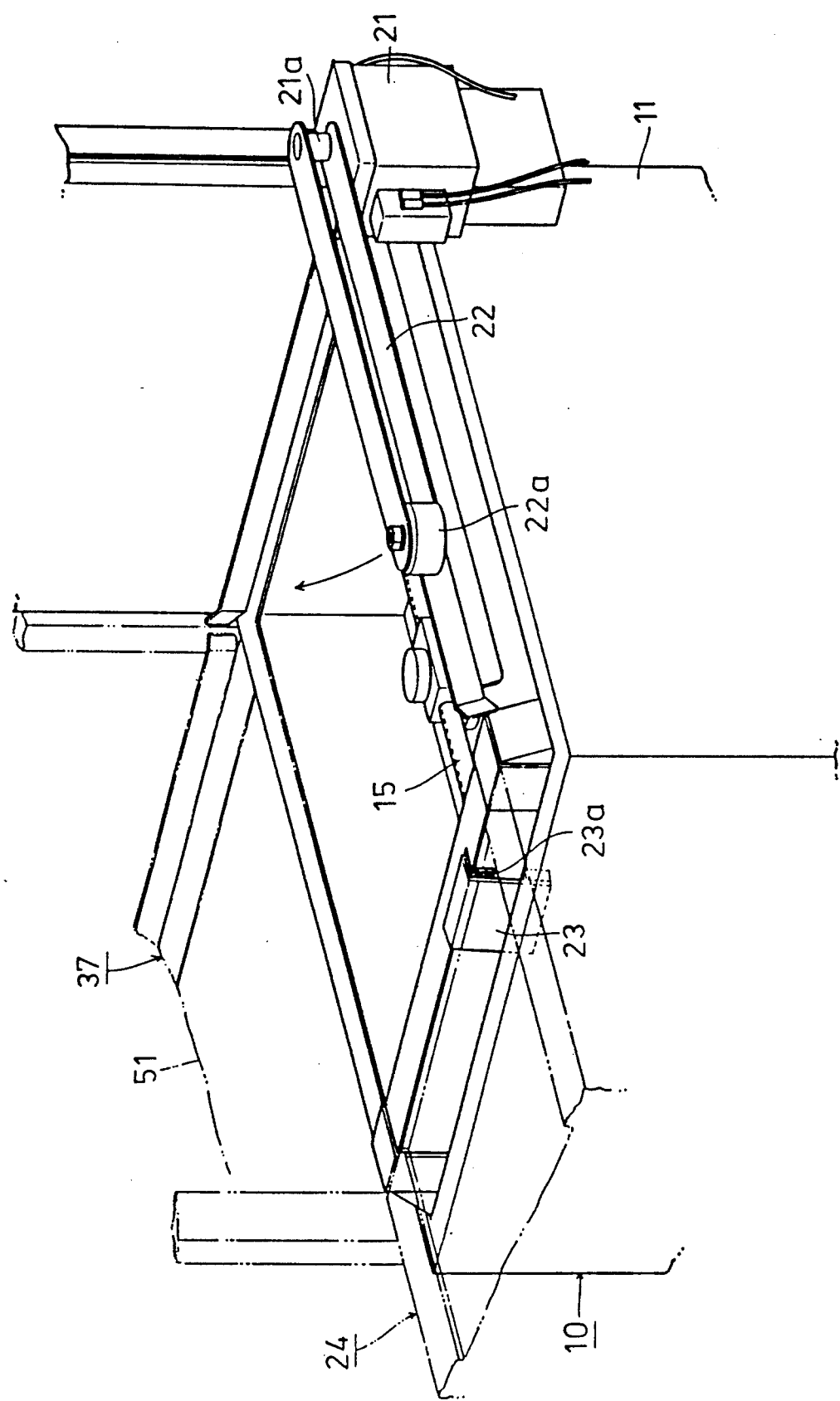
FIG. 3 shows schematically a perspective view of an arm for pushing racks out and a motor for driving the arm, disposed in the dish washing system.

The dishwasher 10 shown in FIGS. 1 to 3 basically has a rectangular washing tank 11 having a full open top and an ascendable box-like casing 12 having a full open bottom so as to be able to cover the washing tank 11. A washing chamber is designed to be defined by closing the washing tank 11 by the casing 12. The structure of the dishwasher 10 is of common one as used in restaurants and the like and equipped with parts and units (not shown) such as a pair of rotating nozzles 15 (only the lower nozzle 15 is shown) opposed horizontally to each other in a vertical relationship, a pump for jetting a cleaning fluid or rinse water, a hot water tank, etc. (all not shown). It should be noted that a rack 14 with used dishes 13 to be washed is designed to be loaded at a predetermined position in the washing tank 11 immediately above the lower nozzle 15.

The casing 12, as shown in FIG. 2, is supported so as to be ascendable along a pair of guide rails 73 (only one rail is shown) disposed perpendicularly along the rear side of the washing tank 11. A cover 18 extended vertically with a predetermined length is disposed on the rear side of the washing tank 11, which covers the mechanism for ascending or descending the casing 12. The output shaft 16a of the motor 16 disposed in the lower position of the washing tank 11 has a sprocket 17 fixed thereto. Another sprocket 19 is rotatably supported at an upper position in the cover 18, and an endless chain 20 is extended over these two sprockets 17,19. A protrusion 12a fixed to the casing 12 is connected to the chain 20 at a suitable position, so that the casing 12 may be ascended or descended as the chain 20 runs with the rotation of the motor 16 in the normal or reverse direction, whereby the washing tank 11 can be opened or closed (covered).

Rack carry-in unit

As shown in FIGS. 1 and 2, a rack carry-in unit 24 for carrying a rack 14 to a predetermined washing position in the washing tank 11 is disposed at the front side of the dishwasher 10. The rack carry-in unit 24 basically consists of a table-like horizontal base 25 on which a rack 14 with used dishes 13 can be loaded. In consideration of the flow of the rack 14 relative to the dishwasher 10, the rack carry-in unit 24 locates upstream the dishwasher 10. The base 25 has its upper surface to be at the same level as that of the rack receiving plane of the washing tank 11 as shown in FIG. 2, and has a mechanism for carrying the rack 14 into the downstream dishwasher 10

More specifically, a pair of horizontal shafts 26 are rotatably supported at both end portions of the horizontal base 25 with a predetermined interval, and sprockets 27 are fixed to the end portions of each shaft 26. A conveyor chain 28 is extended horizontally over each pair of sprockets 27 on each side of the shafts 26. A motor 29 is disposed beneath the base 25, and a sprocket 30 is fixed to the output shaft of the motor 29. A drive chain 31 is extended over the sprocket 30 and a sprocket (not shown), coaxially fixed to the shaft 26 adjacent to the sprocket 27. Accordingly, by driving the motor 29 normally or reversely, the conveyor chains 28 provided on each side of the base run reciprocatingly.

A pusher 32 is disposed to traverse slightly above the base 25 and fixed to the conveyor chains 28 so as to connect them, and the rack 14 is designed to be fed into the dishwasher 10 by the pusher 32. For example, the pusher 32 made of a bar-like material is fixed at the both end portions to the conveyor chains 28 at appropriate opposing positions, as shown in FIG. 1. The pusher 32 advances or retracts horizontally slightly above the base 25 as the reciprocal motion of the conveyor chains 28. The pusher 32 has a U-shaped member 32a protruding horizontally toward the dishwasher 10, which pushes the rack 14 to the washing position in the dishwasher 10 where the rack 14 does not interfere with the descending motion of the casing 12, as will be described later.

As shown in FIG. 2, a couple of dogs 33,34 are attached to one conveyor chain 28 with a predetermined distance therebetween, and a pair of detectors 35,36 are disposed to the base 25, with a predetermined distance therebetween in the longitudinal direction, to be on the rotational route of the dogs 33,34. More specifically, one dog 33 functions to actuate the corresponding detector 35 and reverse the rotational direction of the motor 29, when the motor 29 is driven normally to advance the pusher 32 so as to carry a rack 14 into the dishwasher 10. The other dog 34 functions to actuate the other detector 36 and stop the motor 29, when the pusher 32 is retracted to a predetermined stand-by position.

Rack Carry-Out Device

As will be described later, in the dish washing system shown in FIG. 1, a lifter unit 37 is disposed adjacent to the dishwasher 10 in such a relationship that it may intersect with the rack carry-in line of the rack carry-in unit 24 to form an L-shaped (normal or inverted) arrangement as a whole. Therefore, a mechanism for carrying out the rack 14 with washed dishes toward the lifter unit 37 disposed to intersect with the rack carry-in line of the rack carry-in unit 24 becomes necessary. This mechanism will now be described below.

As shown in FIG. 3 in enlarged view, a motor 21 is disposed on one side of the washing tank 11 of the dishwasher 10 in such a way that the output shaft 21a of the motor 21 may direct upward, and one end portion of the rack pushing arm 22 is fixed to the output shaft 21a. Accordingly, when the arm 22 is turned horizontally in a predetermined direction (clockwise in FIG. 1) by driving the motor 21, the rack 14 locating immediately above the washing tank 11 is pushed out of the dishwasher 10 by the arm 22. In order that the arm 22 may function as described above, the arm 22 is designed to have a length to allow the free end of the arm 22 to push the rack 14 toward the lifter unit 37 to a predetermined distance when it is turned to a position immediately above the washing tank 11 (a size long enough to allow the rack 14 to be fully transferred to the lifter unit 37 by a rack loading device 62 to be described later). Incidentally, a roller 22a is preferably attached to the free end of the arm 22 so as to facilitate smooth feeding of the rack 14.

A guide 23 for regulating the position of the rack 14 is disposed to the washing tank 11 at the front edge which is parallel with the rack carry-out direction, as shown in FIG. 3. When the arm type rack carry-out mechanism is employed so as to save space, the rack 14 is inevitably subject to the clockwise and horizontal turning force of the arm 22 when the rack 14 present immediately above the washing tank 11 is pushed forward by the arm 22 turning clockwise, so that it may happen that the rack 14 is turned counterclockwise to deviate from the rack carry-out line. Accordingly, the rack 14 fails to be aligned with the line of feeding toward the lifter unit 37 disposed downstream. In such case, the deviation of the rack 14 can be prevented by the guide 23, since the side of the rack 14 is abutted against the guide 23 when the arm 22 is turned to push the rack 14 forward.

Incidentally, since the guide 23 is pivotally supported by a pin 23a so as to be slightly pivotable on a horizontal axis, the guide 23 gives way to the rack 14 when it is brought into contact with the rack 14 being transferred from the rack carry-in unit to the washing tank 11. Thus, the rack 14 can smoothly be fed into the washing tank 11. While the guide 23 locates between the dishwasher 10 and the rack carry-in unit 24, it should of course be understood that the guide 23 locates at a level where it does not prevent feeding of the rack 14 into the washing tank 11.

Lifter Unit

As shown in FIG. 1, a lifter unit 37 is disposed adjacent to the dishwasher 10 in such a relationship that it may intersect with the rack carry-in line of the rack carry-in unit 24, which lifter unit 37 carries a rack 14 with washed dishes out of the dishwasher 10 and loads it onto a wagon 67 to be described later. The lifter unit 37 basically contains a frame 40 consisting of an upper and lower rectangular support members 39a,39b and four braces 38 connecting the support members 39 at the four corners, with a lift 42 being disposed therein. The lift 42 can ascend or descend in a horizontal posture along the four braces 38. It should be noted here that the pair of the braces 38 locating on the outlet side of the washing tank 11 is spaced from each other so as to allow the rack 14 to pass therebetween.

Figure 4:
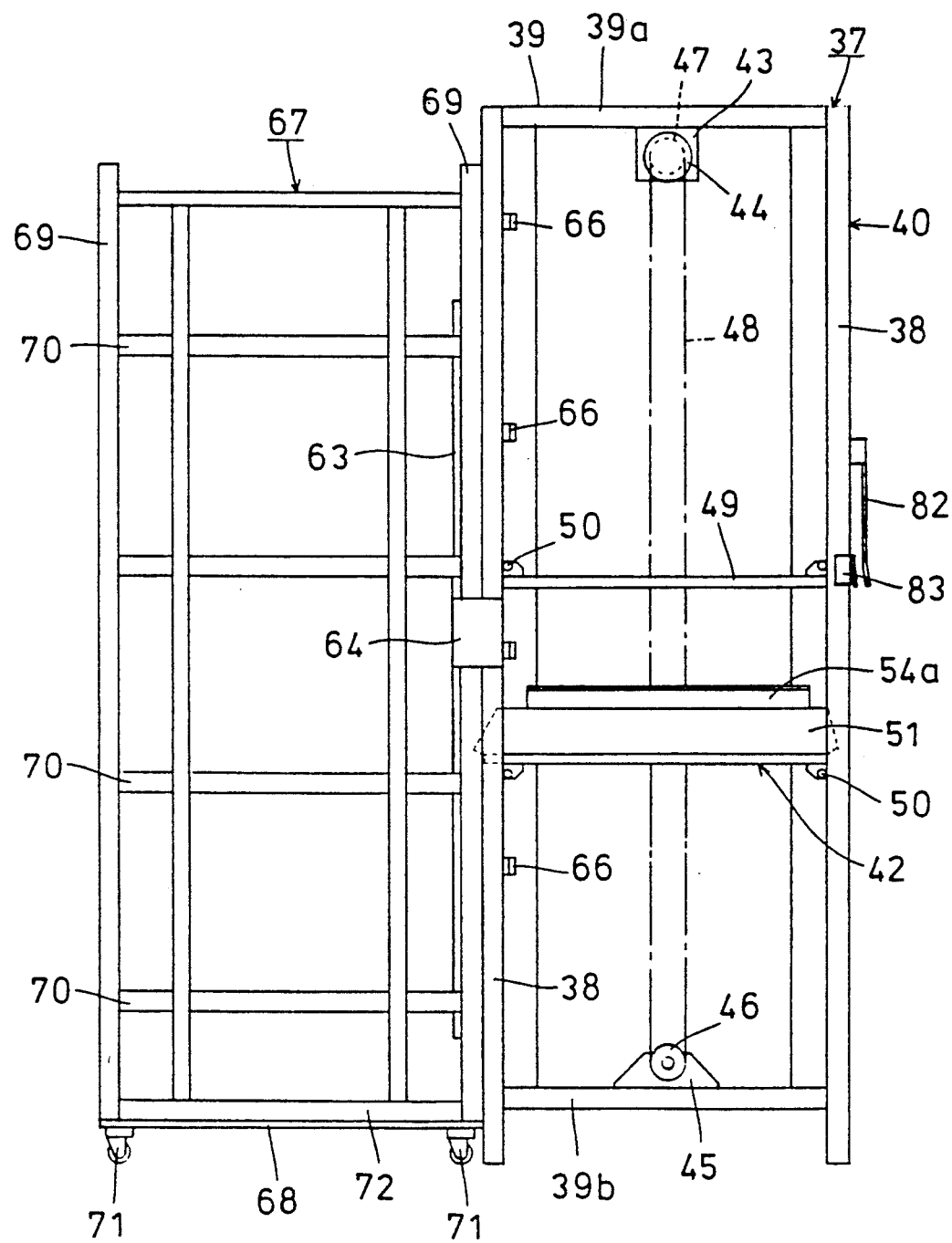
FIG. 4 shows in side view a lifter unit and a wagon.

As shown in FIG. 4, the lift 42 has a rectangular lift frame 49 in which the rack 14 can be accepted. The lift frame 49 has rollers 50 at the respective corners thereof. The rollers 50 are abutted against the corresponding braces 38 and roll therealong so as to be able to ascend or descend the lift frame 49 (lift 42) in the horizontal posture along the braces 38.

As shown in FIGS. 1 and 4, the frame 40 has a bracket 43 suspended from the upper rectangular support member 39a on the side intersecting with the rack carry-in direction, and a motor 44 is mounted onto the bracket 43, with a sprocket 47 being attached to the horizontal output shaft of the motor 44. Another bracket 45 is fixed to the lower rectangular support member 39b locating below the motor 44, and a sprocket 46 is rotatably supported on the inner surface of the bracket 45. An endless chain 48 is extended over the two sprockets 46,47.

The lift 42 is fixed to the chain 48 via a means not shown. Accordingly, the chain 48 is allowed to run by driving the motor 44 normally or reversely, whereby the lift 42 can be ascended or descended via the rollers 50 of the lift frame 49. A plurality of detectors 66 (four detectors in this embodiment) are arranged along any suitable one of the braces 38 at predetermined vertical intervals. The detectors 66 function to detect passage of dogs (not shown) attached to the lift 42 and stop the lift 42 at a predetermined position (where the rack 14 transferred to the lift 42 can be forwarded to the brackets 70 of a wagon 67 to be described later.

Rack Loading Device in the Lift

Figure 5:
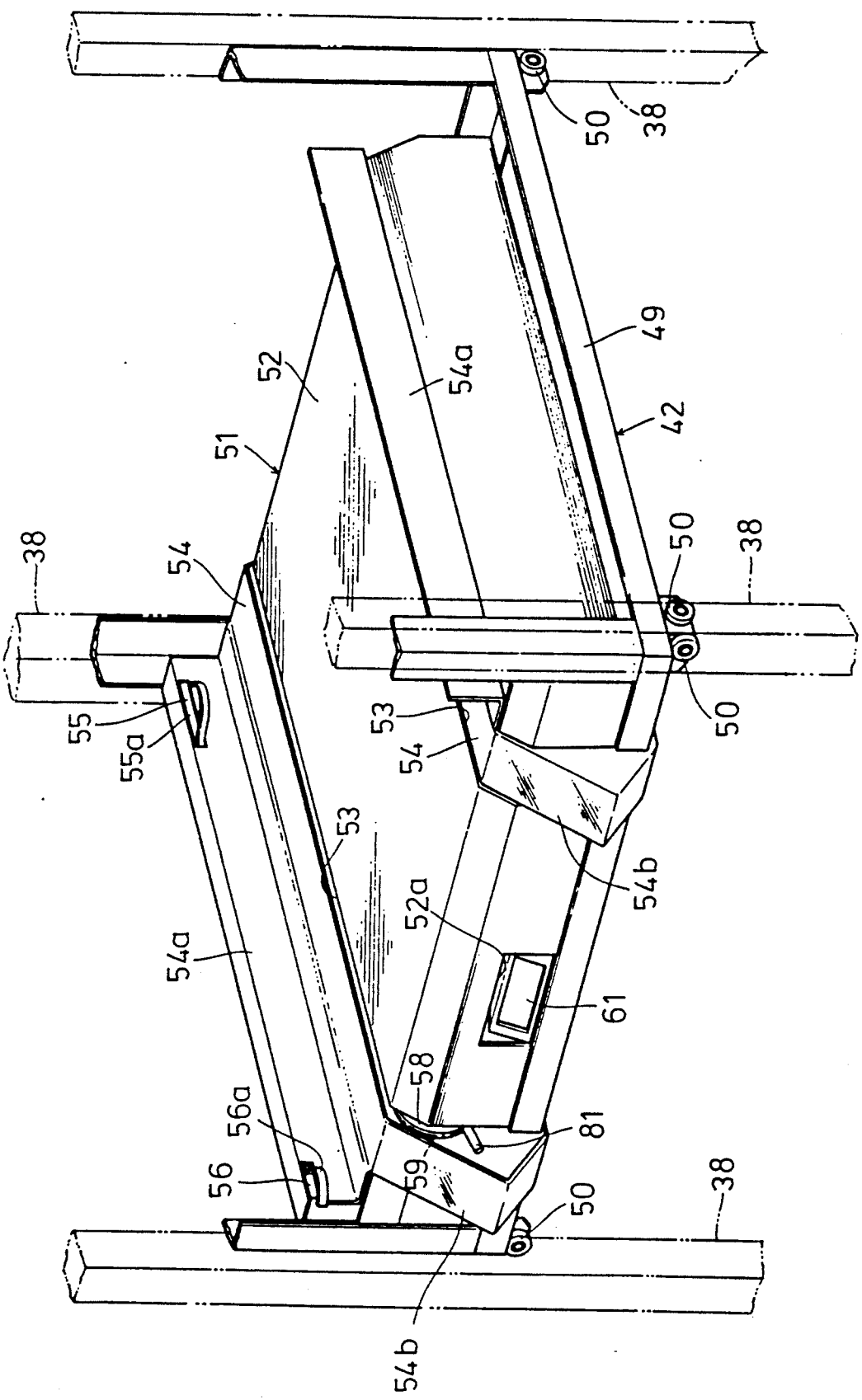
FIG. 5 shows schematically a perspective view of a lift table in the lifter unit.
Figure 6:
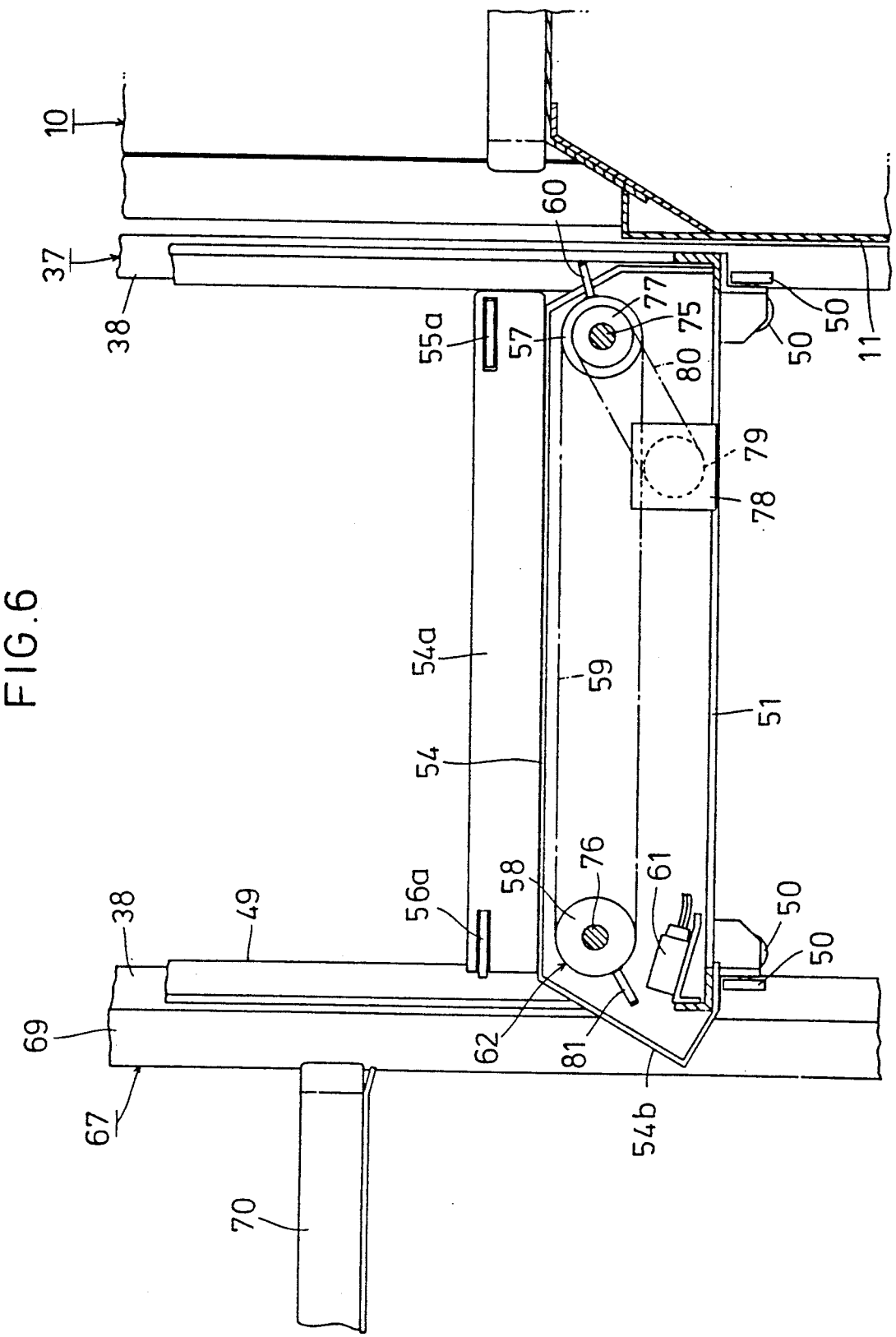
FIG. 6 is a vertical cross section of the lift table shown in FIG. 5.

A lift table 51 is disposed in the lift frame 49, and the lift table 51 is provided with a rack loading device 62 which draws a rack 14 from the dishwasher 10 and transfers it onto the lifter unit 37, in turn, to the wagon 67 to be described later. The lift table 51 has covers 52,54 enclosing the rack loading device 62 disposed therein, and on these covers 52,54 the rack 14 is loaded. For example, as shown in FIG. 5, a rectangular center cover 52 is removably disposed at the center of the lift table 51, and a pair of side covers 54 are arranged on each side of the center cover 52 with predetermined clearances 53 therebetween, respectively.

Each side cover 54 has a guide 54a formed integrally therewith, which extends perpendicularly upward, and the distance between the two opposing guides 54a is designed to allow passage of the rack 14 with washed dishes therethrough. Further, a pair of detectors 55,56 are disposed to one guide 54a adjacent to each longitudinal end portion with their detection pieces 55a,56a protruding inward therefrom. The detector 55 locating at the inlet side of the rack loading device 62 adjacent to the dishwasher 10 functions to detect arrival of the rack 14 and starts the rack loading device 62; whereas the detector 56 disposed on the outlet side of the rack loading device 62 functions to detect completion of loading of the rack 14 onto the lift 42 and stop the rack loading device 62.

A drive shaft 75 and a driven shaft 76 constituting the rack loading device 62 are rotatably supported in the lift table 51 and spaced in the longitudinal direction from each other with a predetermined distance. Sprockets 57,58 are fixed to the drive shaft 75 and the driven shaft 76, respectively, at both ends and disposed below each of the clearances 53 formed between one side cover 54 and the center cover 52 and between the other side cover 54 and the center cover 52, respectively, and an endless chain 59 is extended over each pair of the sprockets 57,58. Another sprocket 77 is fixed to the drive shaft 75 and another endless chain 80 is extended over it and the sprocket 79 fixed to the output shaft of a motor 78 disposed in the lift table 51. Accordingly, when the motor 78 is driven in a predetermined direction, the two endless chains 59 locating below the respective clearances 53 run in the predetermined direction.

Each chain 59 has a pair of protrusions 60,81 each having a length so as to be able to protrude from the corresponding clearances 53 to a predetermined height, which are disposed with a predetermined space therebetween. In the stand-by state before a rack 14 is carried into the lift 42 (see FIG. 8(a)), the protrusions 60 locating at the inlet side are engaged with the rugged bottom of the rack 14 pushed out of the dishwasher 10 by the arm 22 and functions to securely draw the rack 14 from the dishwasher 10 and carry it onto the lift 42 (see FIGS. 8(b),(c)). Meanwhile, the protrusions 81 locating on the outlet side in this stand-by state as described above are abutted against the rear end of the rack 14 carried onto the lift 42 to push the rack 14 forward to the wagon 67 (see FIG. 8(d)). Incidentally, in the stand-by state of the rack loading device 62, the protrusions 60,81 fixed to the endless chains 59 are controlled to always wait at predetermined positions, respectively.

Figure 9B:
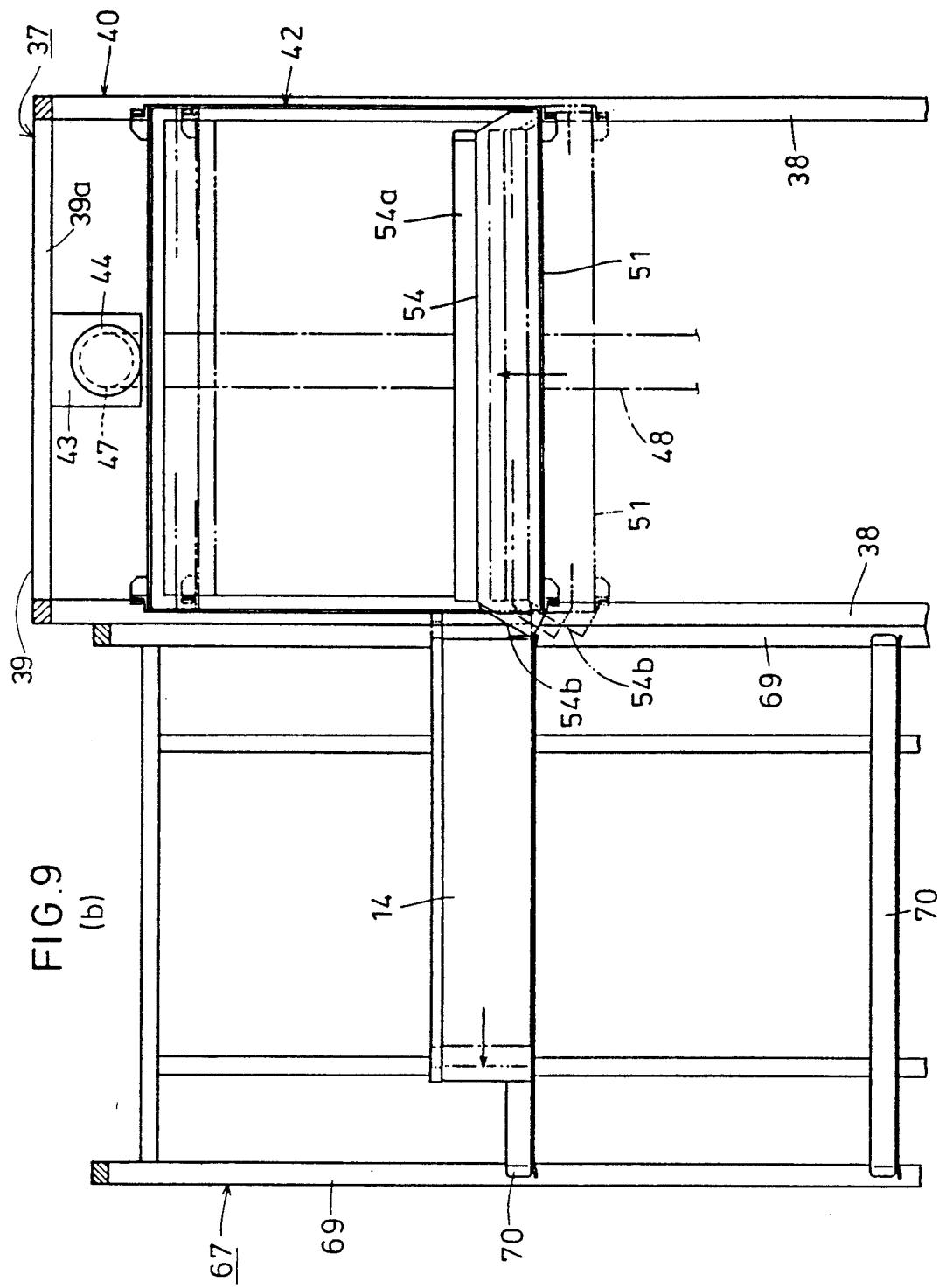
FIG. 9(b) shows in side view the vertical cross section of the major section of the dish washing system when the rack is pushed further into the wagon by ascending the lift table after completion of the transference of the rack from the lift table.

As shown in FIG. 5, the side covers 54 each have a taper 54b, at the outlet end, protruding from the frame 40 toward the wagon 67 to be described later. The tapers 54b are abutted against the rear end of the rack 14 transferred to the wagon 67 and function to push the rack 14 fully into the wagon 67 as the lift 42 ascends, as shown in FIG. 9(b). Thus, the rear end portion of the rack 14 loaded on the wagon 67 is prevented from being struck by the ascending or descending lift 42.

An opening 52a is formed at the outlet end of the center cover 52, and a rack detector 61 is disposed in this opening 52a. The rack detector 61 is designed to detect, e.g. optically, if any rack 14 is already loaded on each pair of brackets in the wagon 67 and actuate the rack loading device 62 only when no rack 14 is present on the brackets.

The pair of braces 38 of the frame 40 locating on the opposite side of the dishwasher 10 have a positioning member 63 and a fitting piece 64, respectively, for setting the wagon 67 against the lifter unit 37 in position. These two members 63,64 are disposed to oppose each other. A guide plate 65 is disposed to the lower support member 39b along the length of the portion between said pair of braces 38 locating on the outlet side, which protrudes from said portion outward beyond the reach of the tapers 54b of the side covers 54. The guide plate 65 has tapers tapering down toward the lower support member 39b at the portions adjacent to the braces 38.

Namely, when the wagon 67 is set in position against the lifter unit 37, the wagon 67 can be prevented from interfering with the tapers 54b of the side covers 54 by fitting the wagon 67 with the positioning member 63 and the fitting piece 64 while the wagon 67 is abutted against the guide plate 65. It should be noted here that a detector for detecting if the wagon 67 is set in position is preferably disposed to the positioning member 63 to achieve overall control of the dish washing system thereby. By the way, when the dishes 13 carried in the rack 14 are of a great size, it may happen that the dishes 13 are struck by the lift frame 49 and damaged. Accordingly, in this embodiment, a detection plate 82 is rotatably supported on the frame 40 at a position directing toward the dishwasher 10, and the detection plate 82 is allowed to actuate a detector 83 disposed to the brace 38 when any dish 13 protruding upward from the rack 14 is abutted against the detection plate 82, whereby the operation of the dish washing system is stopped.

Wagon

The wagon 67 on which racks 14 are to be loaded has a rectangular bottom plate 68 and a pair of inverted U-shaped frames 69 standing upright therefrom with a predetermined distance from each other in the rack carry-in direction. The frames 69 have a plurality of horizontally opposing pairs (four pairs in this embodiment) of L-shaped brackets 70 disposed parallel to the rack loading direction. The respective pairs of brackets 70 are disposed along the frames 69 at predetermined vertical intervals. The bottom plate 68 has four castors 71 on the bottom surface so that the wagon 67 can be moved freely. The bottom plate 68 further has a weir 72 around the edge so that the water drops dropping from the racks 14 loaded on the wagon 67 can be collected therein.

Variation

FIG. 10 shows another preferred embodiment of the dish washing system for practicing the process for washing dishes according to another aspect of this invention, in which the rack carry-in unit 24, dishwasher 10, lifter unit 37 and wagon 67 are arranged linearly. These units all basically have the same constitutions as described above, respectively. However, the rack carry-out mechanism, consisting of the motor 21 and arm 22 shown in FIG. 3, to be disposed beside the dishwasher 10 is omitted in this embodiment. The rack 14 carried into the dishwasher 10 by the rack carry-in unit 24 is pushed out of the dishwasher 10 by forcing another rack 14 into the dishwasher 10 (see FIG. 11). The rack 14 pushed out of the dishwasher 10 to a predetermined distance is further pulled into the lifter unit 37 by the rack loading device 62 disposed in the lifter unit 37.

Electric Control Circuit

Figure 7:
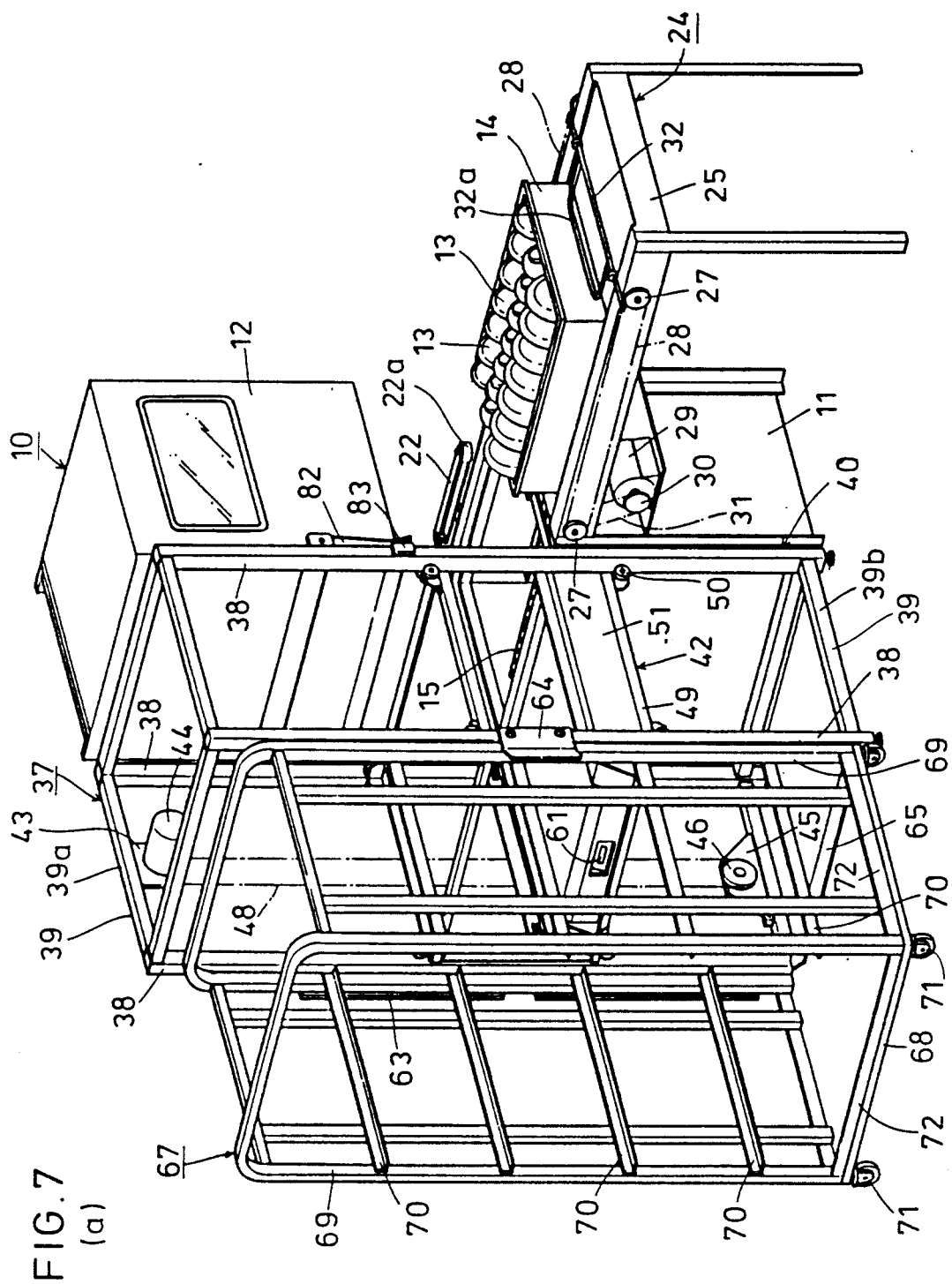
FIGS. 7(a) to 7(f) show schematically and sequentially in perspective views the movement of the dish washing system in operation.
Figure 7B:
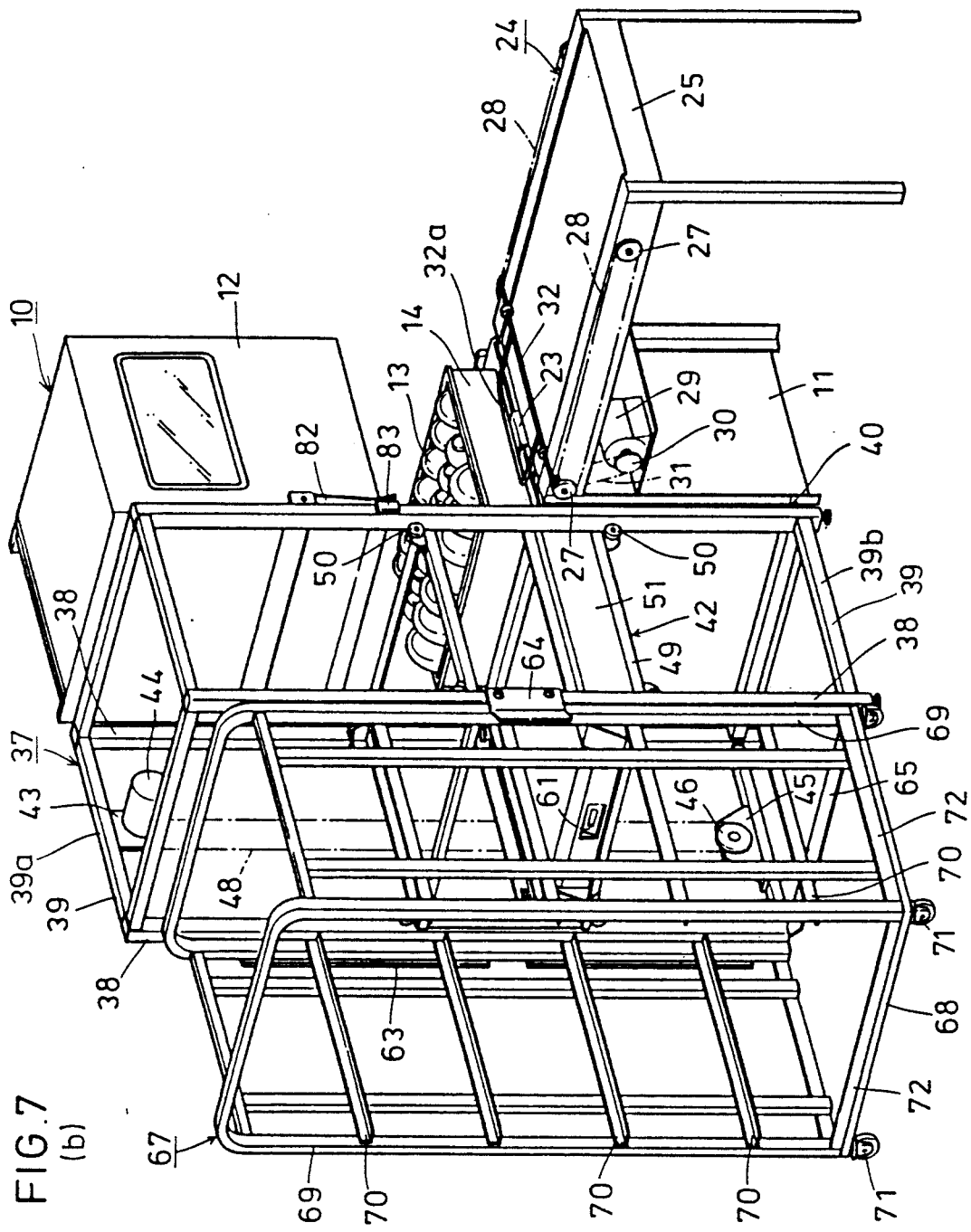
Figure 7C:
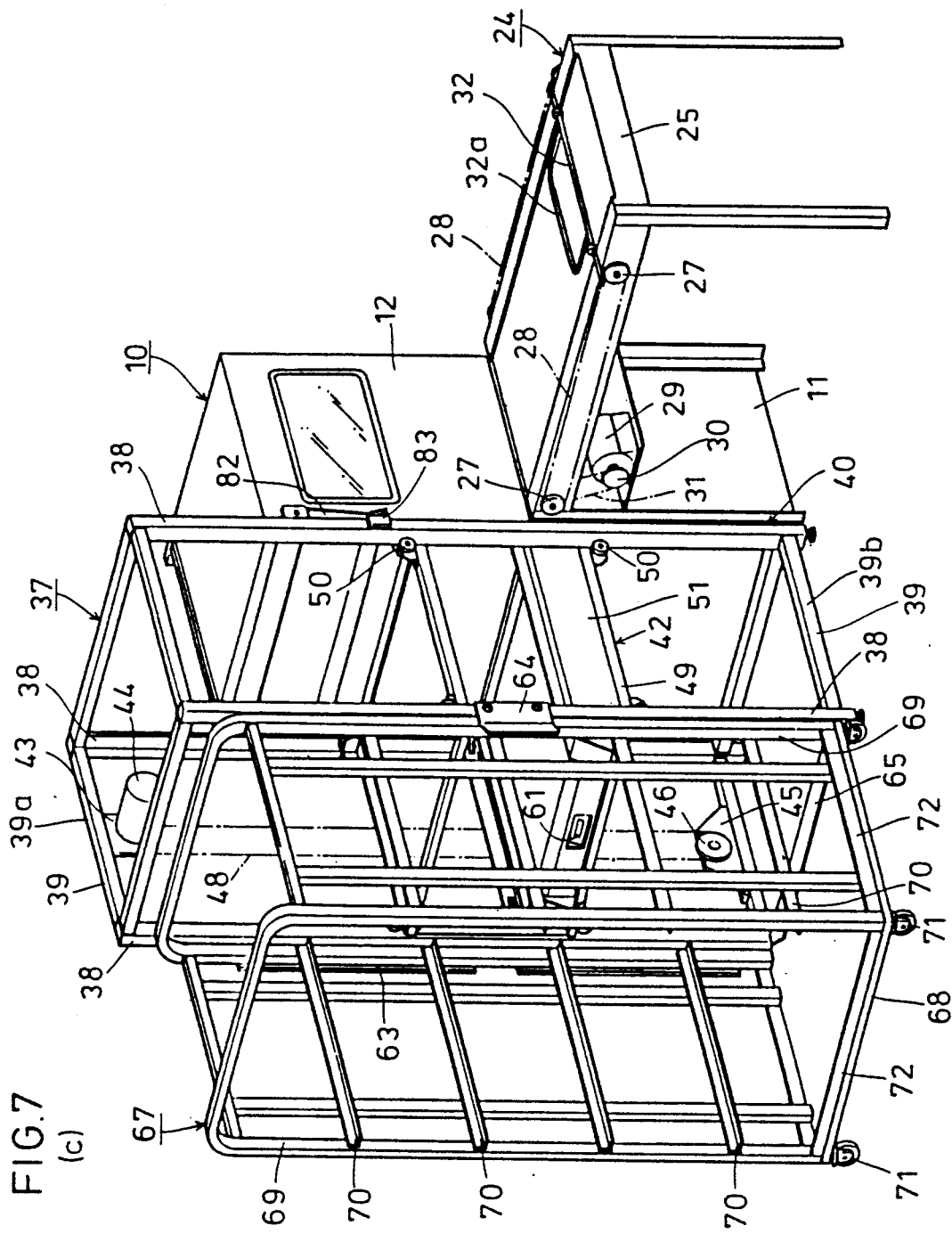
Figure 7D:
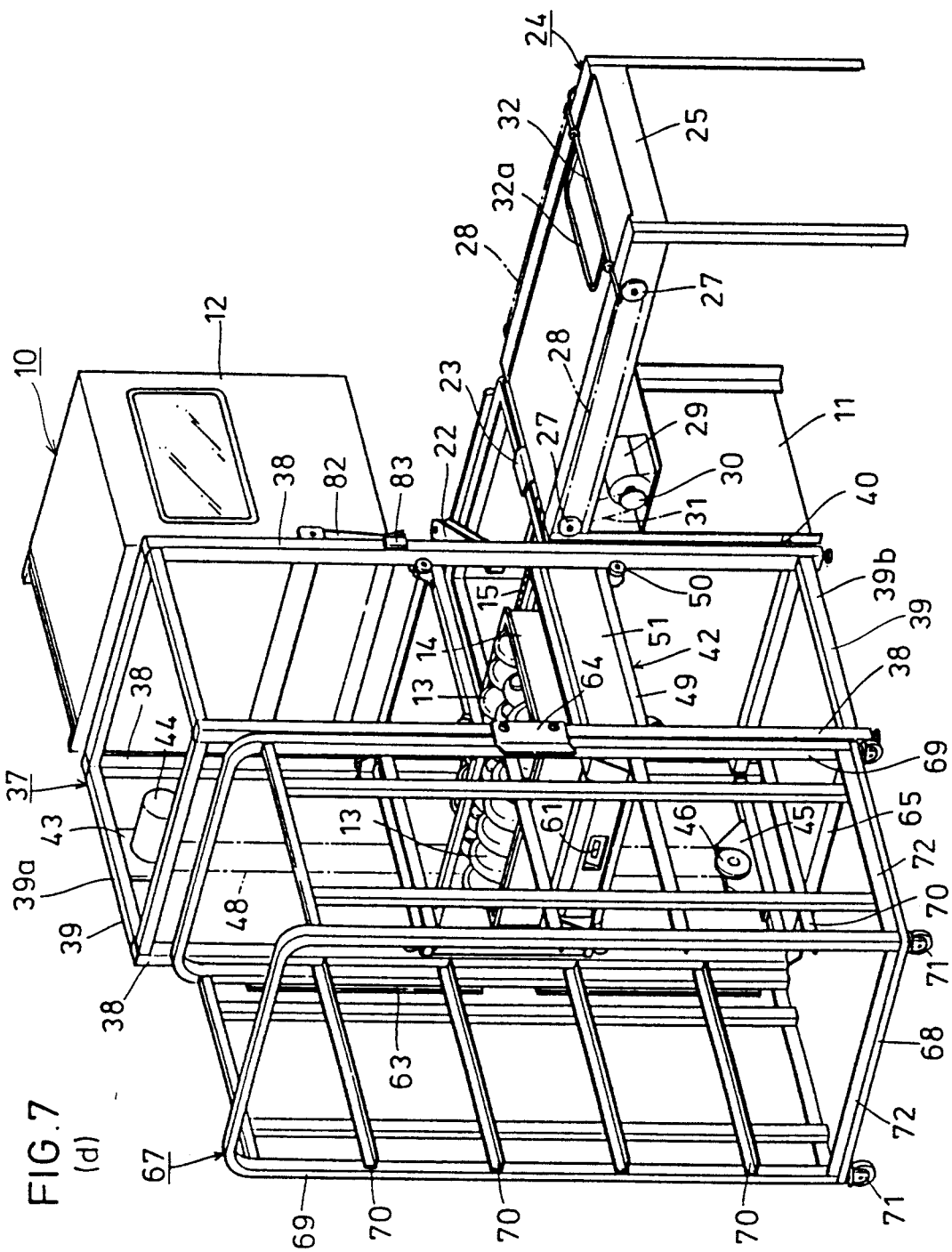

Next, control circuits of the dish washing system will be described referring to FIG. 13. A power switch SW, an emergency stop push-button switch PB and a start switch 90a are disposed respectively at appropriate positions of the rack carry-in unit 24. The power switch SW, in its closed posture, supplies electricity from the commercial power source to the respective electric elements provided in the dish washing system. The emergency stop push-button switch PB is a normally-open push-button switch, which gives an emergency stop signal whenever it is closed temporarily. As the start switch 90a, a self-reset normally-open switch is employed, which is temporarily closed when the dish washing system is started. A zero-position sensor 90b, which is a normally-open switch, is disposed. When the arm 22 is at the zero-position as shown in FIG. 3, the sensor 90b detects it and assumes a closed posture. A pusher end-position sensor 90c, which is a normally-open switch, is disposed. When the arm 22 is turned leftward to the end-position, as shown in FIG. 7(d), the sensor 90c detects it and assumes a closed posture.

A casing open state sensor 90d is also disposed, which is a normally-open switch and closes whenever it detects the open state of the casing 12.

Sensors 100a and 100b which detect start and completion of pushing a rack 14 into the lift 42, respectively, are normally-open microswitches. The former (start sensor) 100a and the latter (completion sensor) 100b are embedded in the right side panel at the front end portion and the rear end portion, respectively. When the rack 14 is pushed forward onto that end portion of the lift table 51 which is closer to the lifter unit 37 in position above the chains 59, the start sensor 100a is closed to give a push-in start signal. Meanwhile, when the front end of the rack 14 locates at the other end portion of the lift table 51 in position above the chains 59, the completion sensor 100b is closed to give a push-in completion signal.

A bracket sensor 110 consists of a normally-open proximity switch provided in the lift table 51 and the dogs disposed to the lifter unit 37 vertically at predetermined intervals. A zero-position sensor 120 having the same constitution as that of the bracket sensor 110 consists of a normally-open proximity switch and a dog. The proximity switch is fixed in a recess formed on the outer surface of the left side panel of the lift 42 at the front end portion with the detection face thereof facing outward. The dog is attached to the left wall of the corresponding brace 38 at the middle of the height. The proximity switch is closed and gives a zero-position signal when the detection face thereof is opposed to the to-be-detected end face of the dog. The length of the zero-position signal corresponds to that of the bracket signal given by the bracket sensor 110.

An upper limit sensor 130 consists of a proximity switch and a dog. The dog is fixed on the left wall of the brace 38 at an upper position. The to-be-detected end face of the dog is allowed to be at such a position that it may be opposed with the detection face of the proximity switch when the lift 42 is ascended to the upper limit. The upper limit sensor 130 gives an upper limit signal by closing the proximity switch, when the detection face of the proximity switch is opposed to the to-be-detected end face of the dog. A lower limit sensor 140 consists of a proximity switch and a dog. The dog is fixed on the left wall of the brace 38 at a lower position. The to-be-detected end face of the dog is allowed to be at such a position that it may be opposed with the detection face of the proximity switch when the lift 42 is descended to the lower limit. The lower limit sensor 140 gives a lower limit signal by closing the proximity switch, when the detection face of the proximity switch is opposed to the to-be-detected end face of the dog.

A wagon sensor 150 is a normally-open microswitch and embedded in the brace 38 at a lower position with the actuator rod thereof protruding outward toward the wagon 67. The wagon sensor 150 is designed to be closed and give a detection signal when the vertical frame members 69 of the wagon 67 are abutted against the braces 38 of the lifter unit 37, as shown in FIG. 4.

A microcomputer 160 executes a main control program and an interrupt control program in cooperation with the emergency stop push-button switch and the respective sensors 100a, 100b, 110, 120, 130, 140 and 150 according to a predetermined flow chart. More specifically, the microcomputer 160, during the execution of the programs, performs operation necessary for the control of driving an OR gate 171 connected to the motor 78 for running the chains 9 of the lift table 51, the motor 44 for ascending or descending the lift 42, drive circuits 170a and 170c connected to a display lamp L, and RS flip-flops 180a, 180b. Incidentally, the main control program and interrupt control program are preliminarily stored in the ROM of the microcomputer 160. Interruption by the interrupt control program is started whenever the timer built in the microcomputer 160 finishes counting. The timer counts a predetermined time (e.g. 10 msec).

The drive circuit 170a selectively releases braking by the geared brake built in the motor 44 corresponding to the electric power supplied from the commercial power source PS to drive the motor 44 normally or reversely, under the control of the microcomputer 160. The motor 44 is rotated normally and reversely corresponding to the ascending and descending of the lift table 51, respectively. The drive circuit 170b selectively releases braking by the geared brake built in the motor 78 corresponding to the electric power supplied from the commercial power source PS to drive or stop the motor 78, under the control of the microcomputer 160 via the OR gate 171 or by the RS flip-flop 180a. The drive circuit 170c selectively lights up the display lamp L corresponding to the electric power supplied from the commercial power source PS, under the control of the microcomputer 160. Incidentally, the display lamp L is preferably disposed to the upper support member 39a of the lifter unit 37.

The RS flip-flop 180a gives a set signal in response to the closing of the casing open-state sensor 90d and start switch 90a and is reset in response to the closing of the pusher end-position sensor 90c. The RS flip-flop 180b gives a set signal in response to the closing signal from the pusher end-position sensor 90c and is reset in response to the closing of the pusher zero-position sensor 90b.

The drive circuit 190a releases braking of the rack feed-out motor 29 to allow the motor 29 to rotate normally at a low speed in response to the set signal of the RS flip-flop 180a and corresponding to the electric power supplied from the commercial power source PS. The drive circuit 190a also releases braking of the rack feed-out motor 29 to allow the motor 29 to rotate reversely at a low speed in response to the set signal of the RS flip-flop 180b and corresponding to the electric power supplied from the commercial power source PS. Incidentally, the drive circuit 170b drives the motor 78 when a set signal is transferred from the RS flip-flop 180a through the OR gate 171.

Function of the Embodiments

The dish washing process to be practiced by operating the dish washing system of the L-shaped arrangement shown in FIG. 1 will now be described. A predetermined number of dishes smeared after use, from which the remaining have roughly been removed, are put upside down into the rack 14. The rack 14 with smeared dishes is loaded on the base 25 of the rack carry-in unit 24, as shown in FIG. 7(a). In this state, the casing 12 of the dishwasher 10 is ascended to a predetermined level and assuming a stand-by posture to open the washing tank 11 and wait for a rack 14 to be carried therein. Subsequently, when the start button (not shown) of the dish washing system is depressed, the motor 29 of the rack carry-in unit 24 is rotated normally to advance the pusher 32 via conveyor chains 28 toward the dishwasher 10, whereby the rack 14 is advanced on the base 25 and carried onto the washing tank 11 of the dishwasher 10 (see FIG. 7(b)).

When the pusher 32 is advanced to a predetermined position, the detector 35 detects arrival of the dog 33 disposed to the conveyor chain 28 to a predetermined position and allows the motor 29 to rotate reversely. When the pusher 32 is retracted to the stand-by position, the detector 36 detects arrival of the other dog 34 to a predetermined position and stops the motor 29. Meanwhile, when the pusher 32 is retracted, the motor 16 disposed to the dishwasher 10 is actuated to descend the casing 12 and cover the washing tank 11, whereby the rack 14 locating on the washing tank 11 is enclosed as shown in FIG. 7(c). When the enclosure by the casing 12 is detected by a suitable detector, washing in the dishwasher 10 is started, and upon completion of washing and rinsing of the dishes 13 after a predetermined time, the motor 16 is rotated reversely to ascend the casing 12. Incidentally, while the dishes 13 are washed in the dishwasher 10, a preparatory operation of loading another rack 14 to be washed next onto the base 25 of the rack carry-in unit 24 can be proceeded.

Subsequently, when the motor 21 in the rack carry-out mechanism disposed on one side of the dishwasher 10 is started to turn the arm 22 horizontally, the rack 14 is pushed out of the dishwasher 10 in the direction intersecting with the rack carry-in direction by about 90°, as shown in FIG. 7(d). Since the rack 14 is prevented from deviating from the rack carry-out direction by the guide 23, the rack 14 can be forwarded to the lifter unit 37 in a sound posture.

Figure 8:
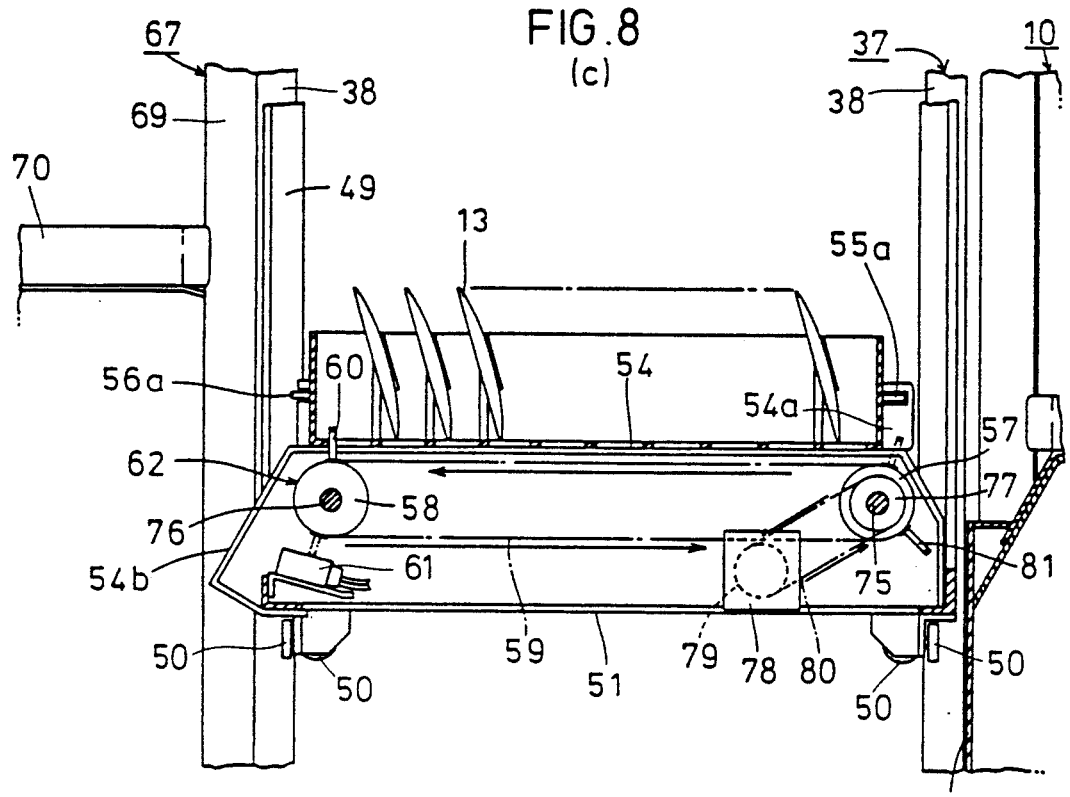
FIGS. 8(a) to 8(d) show schematically in side views of the major section of a rack loading device disposed in the lifter unit so as to illustrate the process of carrying sequentially a rack in and out.
Figure 8:
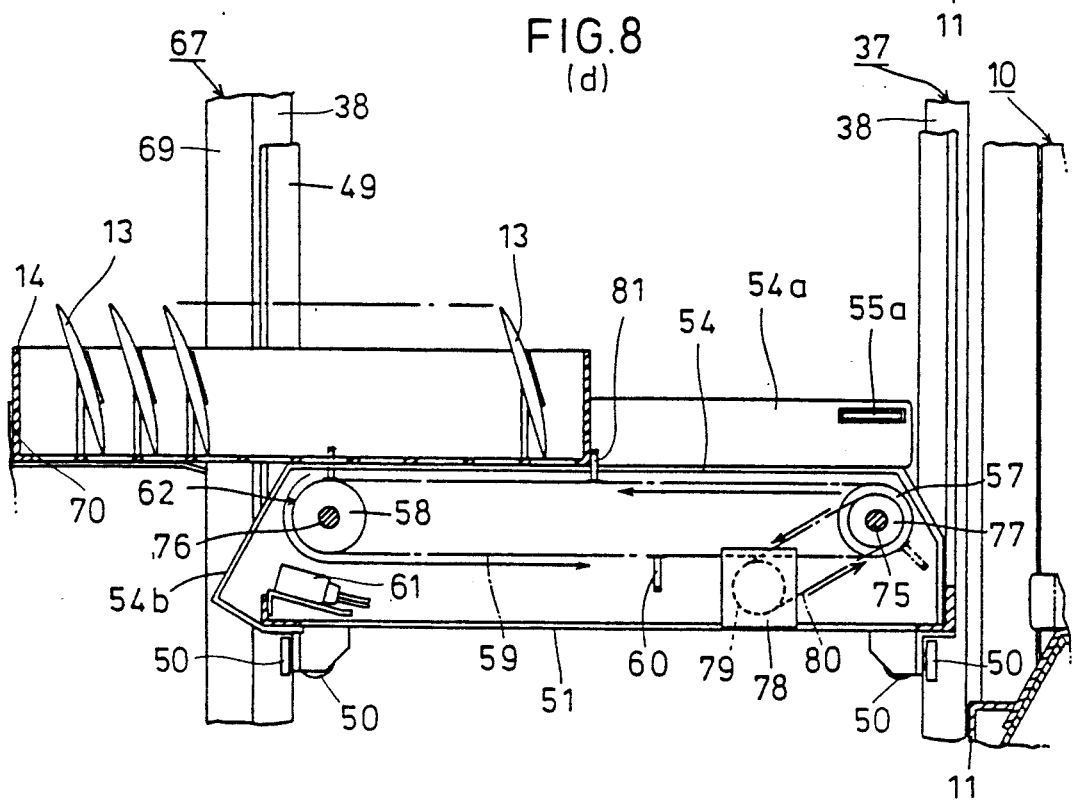

In this process, the rack loading surface (upper surfaces of the covers 52,54) of the lift table 51 in the lifter unit 37 is at the stand-by position, i.e. at the same level as the upper surface of the washing tank 11, as shown in FIG. 8(a). The protrusions 60 fixed to the chains 59 are not yet appearing from the upper surface of the covers 54,52. Accordingly, the front end of the rack 14 pushed out by the arm 22 can move onto the covers 52 and 54 of the lift table 51. Upon actuation of the detector 55 disposed on the inlet side of the side cover 54 by the front end of the rack 14, the rack loading device 62 is started. More specifically, the chains 59 of the rack loading device 62 are allowed to run to engage the protrusions 60 with the rugged bottom of the rack 14, as shown in FIG. 8(b). Thus, the rack 14 is fully pulled out of the dishwasher 10 and transferred to the lift table 51. At the moment that the front end of the rack 14 actuates the detector 56 disposed on the outlet side, driving of the rack loading device 62 is stopped to complete transference of the rack 14 to the lift 42 (see FIG. 8(c)).

Now that the washing tank 11 is empty after transference of the rack 14 from the dishwasher 10 to the lifter unit 37, another rack 14 can be carried into the dishwasher 10 by the pusher 32. Incidentally, since most of the conventional general purpose racks have grid or rugged bottom, no racks of specific shape are particularly necessary and the existing racks can be used as such.

Figure 7E:
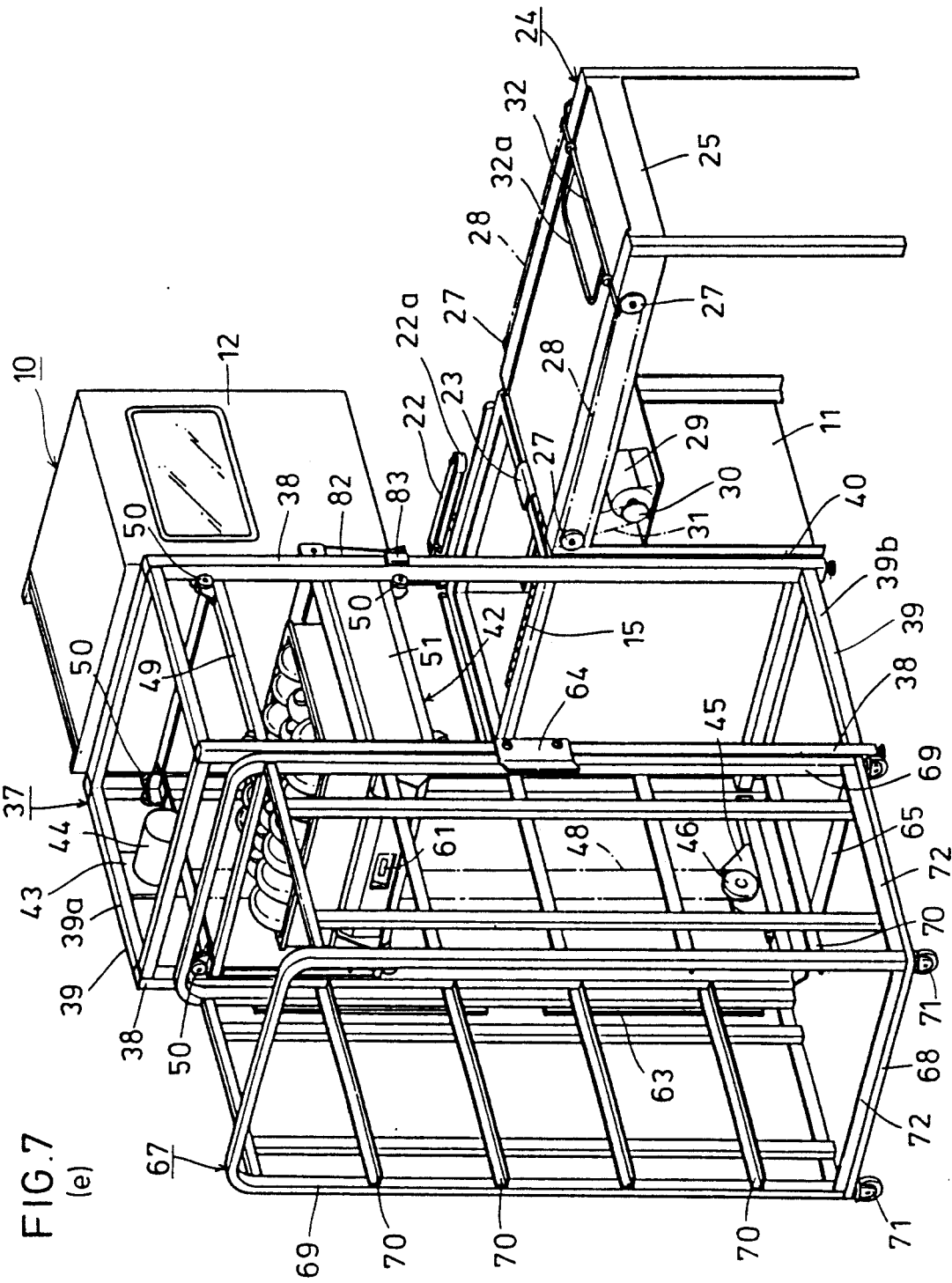
Figure 7:
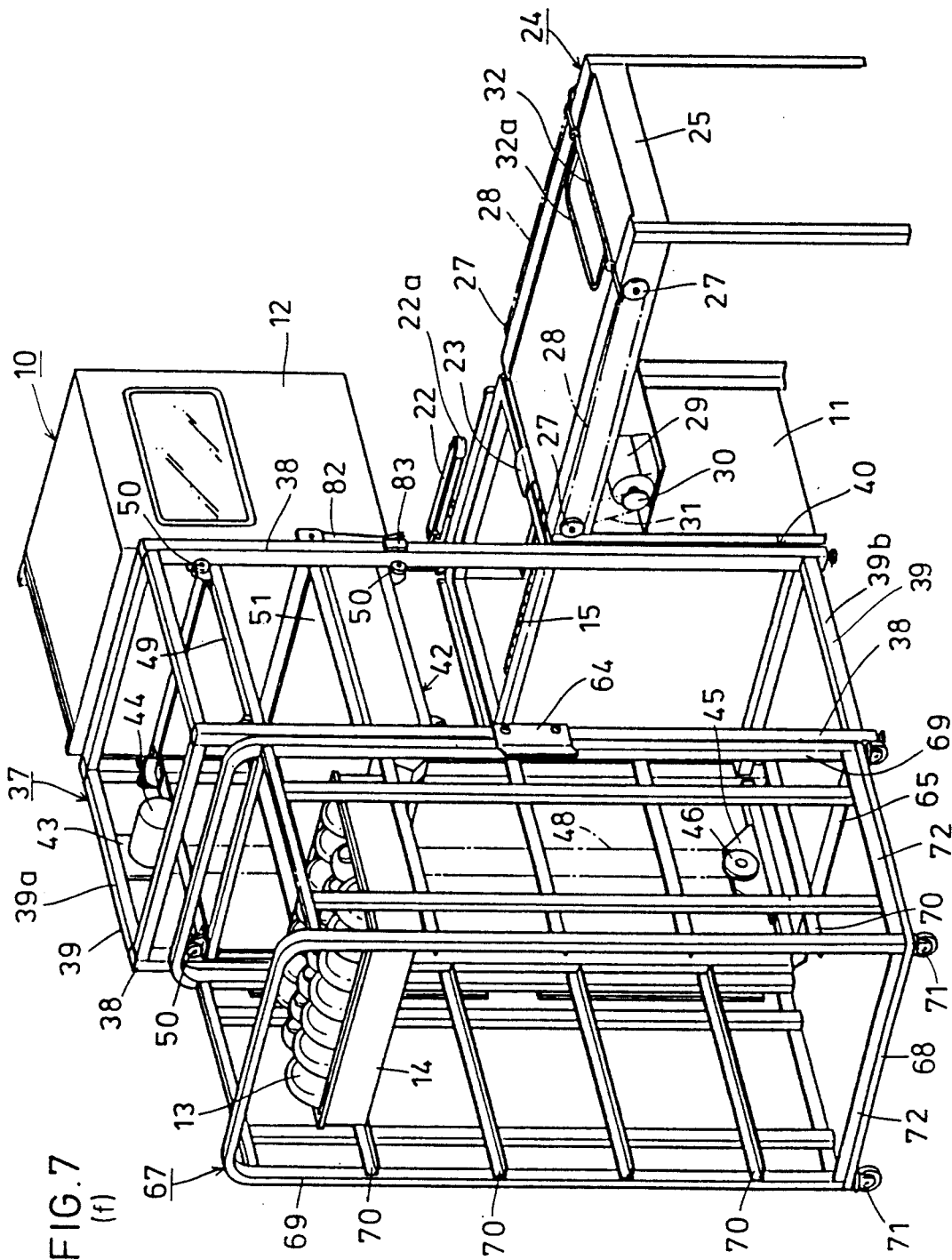

After completion of transference of the rack 14 to the lifter unit 37, the motor 44 is driven in a predetermined direction, for example, to ascend the lift 42. Upon arrival of the dog (not shown) disposed to the lift 42 to the level of the uppermost detector 66 disposed to the brace 38, the detector 66 detects the dog and stops the motor 44 (see FIG. 7(e)). Incidentally, the detectors 66 are disposed at such levels that the upper surface of the lift table 51 in the lift 42 and the rack loading surface of each pair of brackets 70 fixed to the wagon 67 may be on the same horizontal plane when the lift 42 makes a stop.

Then, the rack detector 61 disposed to the lift 42 judges if any rack 14 is present on that pair of brackets 70. When absence of a rack 14 is detected by the rack detector 61, the rack loading device 62 is started. However, if any rack 14 is present on that pair of brackets 70, the lift 42 is descended to stop in front of the second pair of brackets 70, and thus the above operations are repeated. When the rack 14 is loaded onto the wagon 67, it is preferred to program a rack loading sequence in such a way that racks 14 may be loaded from the uppermost pair of brackets 70 toward the lower ones so as to prevent the dishes 13 in the rack 14 already loaded on the wagon 67 from being wetted by the water drops dripping from the rack 14 loaded next.

When the rack loading device 62 is started again, the other pair of protrusions 81 fixed to the chains 59 is abutted against the rear end of the rack 14, as shown in FIG. 8(d) to push the rack 14 as such onto the brackets 70 of the wagon 67. When the protrusions 81 are advanced to the position where they cannot push the rack 14 any further, a detector (not shown) detects this state and stops the rack loading device 62.

Subsequently, the motor 44 is driven to ascend the lift 42 from the level shown in FIG. 9(a) to the level shown in FIG. 9(b), whereby the rack 14 is pushed further to the wagon 67 by the tapers 54b formed on the outlet ends of the side covers (see FIG. 12). Thus, the rack 14 can fully be loaded on a pair of bracket 70 of the wagon 67, as shown in FIG. 7(f). Now, the lift 42 returns to the predetermined stand-by position, and one cycle of dish washing operation is completed. A predetermined number of racks 14 (4 racks in this embodiment) can successively be loaded onto the wagon 67, as described above. Incidentally, when a rack 14 is pushed into the pair of brackets 70 locating below the stand-by position of the lift 42, the rack 14 can securely be pushed into the wagon 67 by ascending the lift 42 to the stand-by position.

As described above, while the lifter unit 37 and wagon 67 are disposed on the left side of the dishwasher 10 in the arrangement of the embodiment of FIG. 1, it should of course be understood that they may be disposed on the right side of the dishwasher 10 depending on the space where the system is installed.

Figure 11:
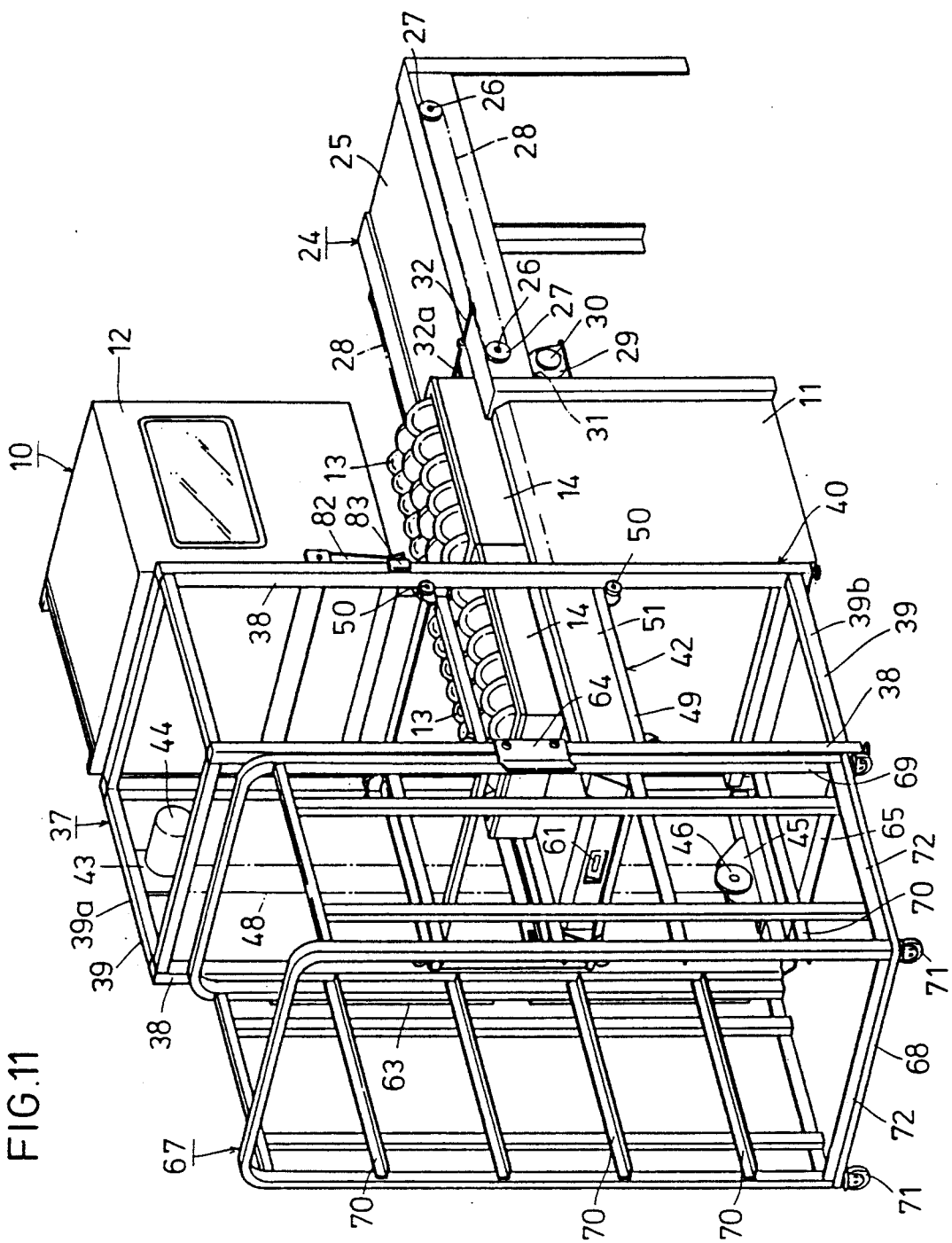
FIG. 11 shows schematically in perspective view the dish washing system shown in FIG. 10 when the rack after completion of washing in the dishwasher is transferred to the lifter unit.

The dish washing process to be practiced by operating the dish washing system of the linear arrangement shown in FIG. 10 uses substantially the same basic operations as in the above embodiment except that the operation of forwarding the racks by the rack carry-out device shown in FIG. 3 is omitted. However, the forwarding of the rack 14 from the dishwasher 10 to the lifter unit 37 is achieved by forcing the following rack 14 to be washed next into the dishwasher 10 from the rack carry-in unit one after another, as shown in FIG. 11.

The last rack 14 fed from the dishwasher 10 into the lifter unit 37 can usually be loaded smoothly onto the wagon 67. However, when all of the brackets 70 in the wagon 67 are occupied by the racks 14 with washed dishes, the last rack 14 remains in the lifter unit 37. In such cases, it may happen that an operator brings out the rack 14 manually from the lifter unit 37 to a wagon 67 having some empty brackets 70.

If the operator brings his hands into the lifter unit 37 from the open dishwasher side, he is exposed to danger when the lifter unit 37 is actuated inadvertently. Therefore, a control is preferably performed, for example, by providing a safety switch (not shown) at an appropriate position of the dish washing system so as to close the casing 12 of the dishwasher 10 by depressing the switch and make the casing 12 unopenable, as well as, to automatically actuate the lifter unit 37 to ascend or descend the rack 14 and introduce the rack 14 to some empty brackets 70.

Further, when the rack 14 is transferred from the lifter unit 37 to a wagon 67, a plurality of wagons (e.g. three wagons) of the same specifications may serially be arranged so that racks 14 may successively be fed from the lifter unit 37 to the pairs of brackets 70 locating at the same level of the respective wagons 67. When the pairs of the brackets 70 at one level of all of the serially arranged plurality of wagons 67 are all occupied by the racks 14, loading of racks 14 onto the brackets 70 at the second level of all of the serially arranged plurality of wagons 67 is started. Thus, rack loading onto a plurality of wagons 67 can be automated to treat a large amount of dishes successively. This automatic operation can easily be realized by changing the program, in the control unit, of the ascend/descend sequence of the lift 42 in the lifter unit 37.

As has been described above, according to the process and system for washing dishes of this invention, a huge amount of used dishes in large-scale restaurants, such as hotels having large banquet rooms and large drive-ins can effectively be cleaned successively. Moreover, since the series of operations from washing to loading onto wagons can be carried out with the dishes being carried in racks, sequentially, the present process and system contribute to energy saving and improvement of working environment.

Further, the present dish washing system can be realized only by improving the existing system a little, and the existing general purpose racks can be used as such. Accordingly, facility investment associated with the dish washing operation can be held minimum.

What is claimed is:

1. A dish washing system comprising:
    a rack carry-in unit (24) in which a rack (14) with dishes (13) to be washed can be loaded, having a mechanism (32) for carrying the rack (14) toward a downstream dishwasher (10) along a rack carry-in line;
    a dishwasher (10) including a washing tank (11) and equipped with a casing (12) having an open bottom for covering said washing tank (11) having an open top, wherein the casing (12) is ascended or descended by a drive means (16, 17, 19, 20) to allow carrying the rack (14) horizontally in and out of the washing tank (11);
    a rack carry-out mechanism (21, 11) disposed adjacent to the dishwasher (10) for feeding the rack (14) after completion of dishwashing in a direction intersecting with the rack carry-in line of the rack carrying unit (24);
    a lifter unit (37) disposed adjacent to the dishwasher (10) in such a relationship that the rack carry-out line of the lifter unit (37) intersects with the rack carry-in line of the rack carry-in unit (24), having a lift (42) which is ascended or descended in a horizontal posture by a lift mechanism (44, 46, 47, 48);
    a rack loading device (62) disposed adjacent to the lift (42) for pulling the rack (14) fed out by the rack carry-out mechanism (21, 22) to a predetermined position in the lift (42), as well as, forwarding the rack (14) from the lift (42) located at a predetermined level to a downstream wagon (67); and
    a wagon (67) for receiving the rack (14) fed out of the lift (42) on a plurality of bracket pairs (70) disposed therein at predetermined vertical intervals, wherein said wagon is removably set at the outlet side of the lifter unit (37).

2. A dishwashing system comprising:
    a rack carry-in unit (24) on which a rack (14) with dishes (13) to be washed can be loaded, having a mechanism (32) for carrying the rack (14) toward a downstream washer (10);
    a dishwasher (10) including a washing tank and equipped with a casing (12) having an open bottom for covering a washing tank (11) having an open top, wherein the casing (12) is ascended or descended by a drive means (16, 17, 19, 20) to allow carrying the rack (14) horizontally in and out of the washing tank (11);
    a lifter unit (37) having a lift (42) which is ascended or descended in a horizontal posture by a lift mechanism (44, 46, 47, 48), for pulling the rack (14) with washed dishes to a predetermined position in the lift (42), as well as, forwarding the rack (14) from the lift (42) located at a predetermined level to a downstream wagon (67); and
    a wagon (67) for receiving the rack (14) fed out of the lift(42) on a plurality of bracket pairs (70) disposed therein at predetermined vertical intervals, wherein said wagon is removably set to the outlet side of the lifter unit (37);
    wherein the rack carrying unit (24), the dishwasher (10), the lifter unit (37) and the wagon (67) are respectively arranged serially.

* * * * *